(12) United States Patent
Fenouil

(10) Patent No.: US 6,240,554 B1
(45) Date of Patent: *May 29, 2001

(54) LOCAL AREA NETWORK FOR SIMULTANEOUS, BI-DIRECTIONAL TRANSMISSION OF VIDEO BANDWIDTH SIGNALS

(75) Inventor: Remy L. Fenouil, Louisville, KY (US)

(73) Assignee: iGate Incorporate, Louisville, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/624,564

(22) PCT Filed: Oct. 18, 1994

(86) PCT No.: PCT/US94/11722

§ 371 Date: Apr. 10, 1996

§ 102(e) Date: Apr. 10, 1996

(87) PCT Pub. No.: WO95/11570

PCT Pub. Date: Apr. 27, 1995

Related U.S. Application Data

(63) Continuation-in-part of application No. 08/140,230, filed on Oct. 20, 1993, now Pat. No. 5,537,142.

(51) Int. Cl.$^7$ ............................................... H04N 7/14

(52) U.S. Cl. ........................ 725/105; 725/122; 725/127; 348/14.01; 348/14.11

(58) Field of Search .................................. 348/6, 7, 8, 9, 348/10, 12, 13, 14, 15, 16, 17, 18, 19, 180, 191, 192, 193, 552, 705, 14.11; 455/3.1, 4.1, 4.2, 5.1, 6.1, 6.2, 6.3; 704/200, 204–207, 217–219, 223–225; 345/327, 328; 379/1, 9, 34, 90.01, 202; 725/105, 119–123, 127; H04N 7/10, 7/15, 7/12, 7/14, 7/173

(56) References Cited

U.S. PATENT DOCUMENTS

| | | | |
|---|---|---|---|
| 3,728,649 | 4/1973 | Waldhauer | 333/18 |
| 4,292,475 | 9/1981 | Hill et al. . | |
| 4,628,437 | 12/1986 | Poschmann et al. . | |
| 4,640,989 | 2/1987 | Riner et al. . | |
| 4,652,873 | 3/1987 | Dolsen et al. . | |
| 4,682,349 | 7/1987 | Sorriaux . | |
| 4,686,698 | 8/1987 | Tompkins et al. . | |
| 4,710,917 | 12/1987 | Tompkins et al. . | |

(List continued on next page.)

FOREIGN PATENT DOCUMENTS

| | | |
|---|---|---|
| 2743765 | 4/1978 | (DE) . |
| 0 098 226 | 1/1984 | (EP) . |
| 0 169 548 | 1/1986 | (EP) . |

(List continued on next page.)

OTHER PUBLICATIONS

Broad Band Switching System, Nakajima et al. Review of the Electrical Communication Laboratories.

(List continued on next page.)

Primary Examiner—John W. Miller
(74) Attorney, Agent, or Firm—Finnegan, Henderson, Farabow, Garrett & Dunner, LLP.

(57) ABSTRACT

A local area network for the simultaneous, bi-directional transmission of video bandwidth signals includes an economical switching matrix.

18 Claims, 21 Drawing Sheets

U.S. PATENT DOCUMENTS

| | | |
|---|---|---|
| 4,716,585 | 12/1987 | Tompkins et al. . |
| 4,726,054 | 2/1988 | Molnar . |
| 4,740,956 | 4/1988 | Hailpern et al. . |
| 4,742,515 | 5/1988 | Dabholker et al. . |
| 4,744,078 | 5/1988 | Kowalczyk . |
| 4,766,589 | 8/1988 | Fisher . |
| 4,792,941 | 12/1988 | Yanosy, Jr. et al. . |
| 4,847,829 | 7/1989 | Tompkins et al. . |
| 4,885,569 | 12/1989 | Lellouche . |
| 4,885,747 * | 12/1989 | Foglia . |
| 4,888,560 | 12/1989 | Ogura ................... 330/254 |
| 4,918,516 | 4/1990 | Freeman . |
| 4,949,170 | 8/1990 | Yanagidaira et al. . |
| 4,955,048 | 9/1990 | Iwamura et al. . |
| 4,977,449 | 12/1990 | Morgan . |
| 5,008,879 | 4/1991 | Fischer et al. . |
| 5,014,267 | 5/1991 | Tompkins et al. . |
| 5,042,062 | 8/1991 | Lee et al. . |
| 5,107,256 | 4/1992 | Ueno et al. . |
| 5,130,793 * | 7/1992 | Bordry et al. . |
| 5,200,989 | 4/1993 | Milone . |
| 5,247,347 | 9/1993 | Litteral et al. ................... 358/85 |
| 5,283,637 * | 2/1994 | Goolcharan ................... 348/17 |
| 5,363,068 * | 11/1994 | Georger ................... 333/25 |
| 5,365,264 | 11/1994 | Inoue et al. . |
| 5,367,273 * | 11/1994 | Georger et al. . |
| 5,414,708 | 5/1995 | Webber et al. . |
| 5,537,142 * | 7/1996 | Fenouil ................... 348/12 |

FOREIGN PATENT DOCUMENTS

| | | |
|---|---|---|
| 386981A | 3/1989 | (EP) . |
| 0 405 743 | 1/1991 | (EP) . |
| 2 675 604 | 10/1992 | (FR) . |
| 2094592 | 2/1981 | (GB) . |
| 2 222 926 | 3/1990 | (GB) . |
| 3135133 | 6/1991 | (JP) . |
| 05168016 | 7/1993 | (JP) . |
| WO 92 01346 | 1/1992 | (WO) . |
| WO 92 05511 | 4/1992 | (WO) . |
| WO 93 11637 | 6/1993 | (WO) . |

OTHER PUBLICATIONS

Live–Net—An Integrated Broadband Video and Data Network Computer Communications.

Design of a Nonblocking Shared–Memory Copy Network for ATM Bianchini & Kim, Dept. of Electrical and Computer Engineering.

Hierarchical Distribution of Video with Dynamic Port Allocation Yum, IEEE 1991.

* cited by examiner

LOCAL AREA NETWORK FOR SIMULTANEOUS, BI-DIRECTIONAL TRANSMISSION OF VIDEO BANDWIDTH SIGNALS

This is a continuation-in-part of U.S. patent application Ser. No. 08/140,230, filed Oct. 20, 1993, now U.S. Pat. No. 5,537,142, and is a national filing of international application PCT/US94/11722, filed Oct. 18, 1994.

BACKGROUND OF THE INVENTION

The present invention relates to local area networks, and, in particular, to a local area network for the simultaneous, bi-directional transmission of video bandwidth signals.

Local area networks which can transmit video bandwidth signals are known.

FIGS. 1–3 show some prior art networks. In FIG. 1, there is a hub 10, which includes a central processor and an N×N crosspoint switch, with N being the number of user paths 18 (the number of inputs and the number of outputs) to be connected to the hub 10. The N×N crosspoint switch in the hub 10 permits all the users 12 on the hub 10 to communicate with each other, but it is limited to N users.

FIG. 2 shows one way in which the arrangement of FIG. 1 can be expanded to include more users. In that arrangement, three users 12 have been removed from each hub 10, and the other user ports have been used to connect to other hubs 10 along the paths 14. In this way, more users can be interconnected, but there is a limit to the number of users that can be connected to this system, because every time a new hub is added, a user has to be subtracted from all the other hubs.

FIG. 3 shows a way in which many hubs 10 can be interconnected by connecting them to a bus 20 along the paths 16. With this arrangement, a user 12A connected to the hub 10A on the left can communicate with a user 12C connected to the hub 10C on the right by transmitting a signal along its respective path 18A to its hub 10A, along the path 16A to the bus 20, where it occupies a channel along the entire bus 20, which can be received by a user 12C by passing along the path 16C to the hub 10C and then to the user 12C. This arrangement is limited in that, once all the channels on the bus 20 are used up, no additional signals can be transmitted from hub to hub. If a video conference is being conducted between a user 12A and a user 12C on channel 1, then users 12F and 12G (off the page to the right) cannot conduct another video conference on channel 1 at the same time.

The arrangement of FIG. 3 is also severely limited in the number of connecting lines 16 between each hub 10 and the bus 20, so that, if there is only one connecting line 16A between the hub 10A and the bus 20, then only one channel of the bus 20 can be used by the users 12A at any one time. This means that, if a user 12A is conducting a video conference with a user 12C on channel 1, then another user 12A cannot watch a video on another channel of the bus 20 at the same time. In order to provide more connecting lines to the bus 20, users 12 would have to be removed from the hub 10, which again limits the function of the network.

Another problem with prior art networks is that, if they use twisted pair wiring, they are very limited in the distance over which they can carry signals before the signal degrades to the point that it is not useful.

SUMMARY OF THE INVENTION

The present invention provides a local area network for the simultaneous, bi-directional transmission of video bandwidth signals which is very versatile while also being very cost-effective.

The present invention provides a local area network which can be used for video-conferencing, for remote control and viewing of video tapes or video cameras, and so forth.

The present invention provides a local area network which permits channel segmentation, so that a signal may be stopped at a switching matrix and replaced by another signal which travels on the same channel to the next switching matrix. This permits greater flexibility than does a typical bus, in which the same signal is transmitted to all users on a given channel.

The present invention also provides for the automatic equalization of signals to compensate for signal degradation, so that signals can be sent over twisted pair wiring for long distances.

DESCRIPTION OF THE PREFERRED EMBODIMENT

Figure 4:
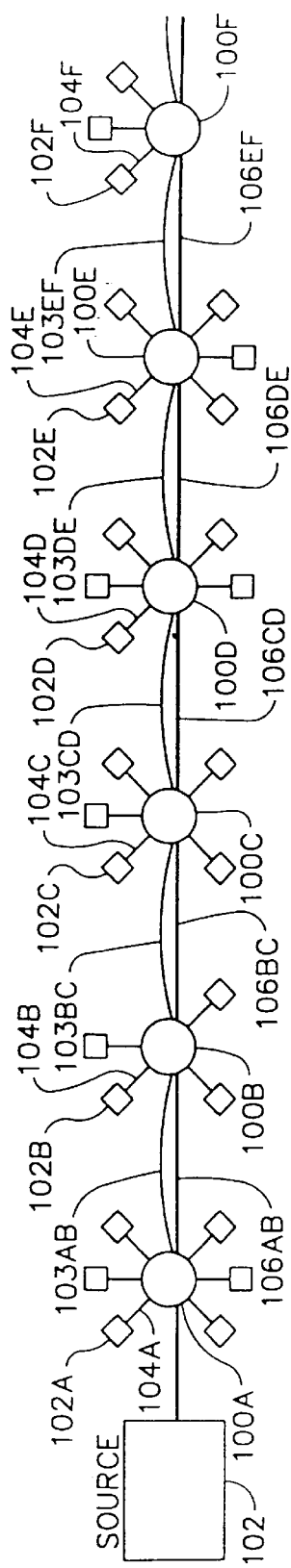
FIG. 4 is a view of a network made in accordance with the present invention.

An example of a first embodiment of a network made in accordance with the present invention is shown in FIG. 4. In that arrangement are shown several switching hubs 100 A through F. Each hub 100 has several users 102, which are connected to their hub 100 along paths 104. Each hub 100 includes a central processor and a plurality of crosspoint switches interconnected to form a matrix, which will be described in more detail later. In the preferred embodiment, the hubs 100 also do some treatment of the signals, as will be described later.

The arrangement shown in FIG. 4 has the ability to continue to add more users by adding more hubs along an internodal pathway 106. The internodal pathway 106 permits the addition of more hubs, as does the bus 20 of FIG. 3, but it has the added advantage that, because of the functionality of the switching matrix inside each hub 100, it can segment the channels which are carried by the pathway 106, so that the signal carried on channel 1 along the internodal path 106AB, between the hubs 100A and 100B, may be different from the signal carried on channel 1 along the internodal path 106BC, between the hubs 100B and 100C. This means that each channel can carry a variety of signals along its length, thereby greatly increasing the number of signals that can be carried by a given size of network. In addition to the internodal pathway 106, there is also an internodal digital link 103 between hubs 100 for carrying digital signals. The purpose of the internodal digital link 103 will be explained in more detail later.

Figure 1:
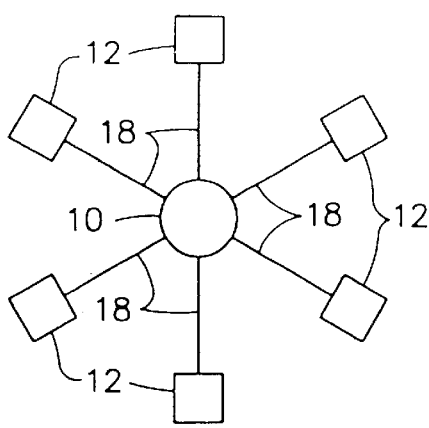
FIG. 1 is a view of a star configuration network, as known in the prior art.
Figure 2:
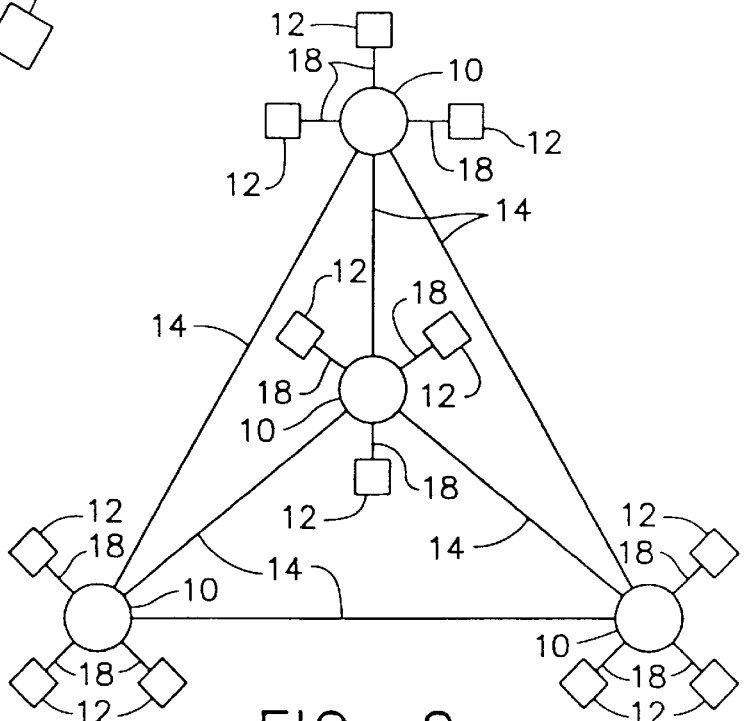
FIG. 2 is a view of another type of prior art network configuration.

In the prior art network shown in FIG. 2, each connection from one hub to another is the same as a user connection. Thus, if a hub is adapted to be connected to ten other hubs and to six users (sixteen inputs and sixteen outputs), that hub must include a 16×16 crosspoint switch (with 256 switching points).

Figure 3:
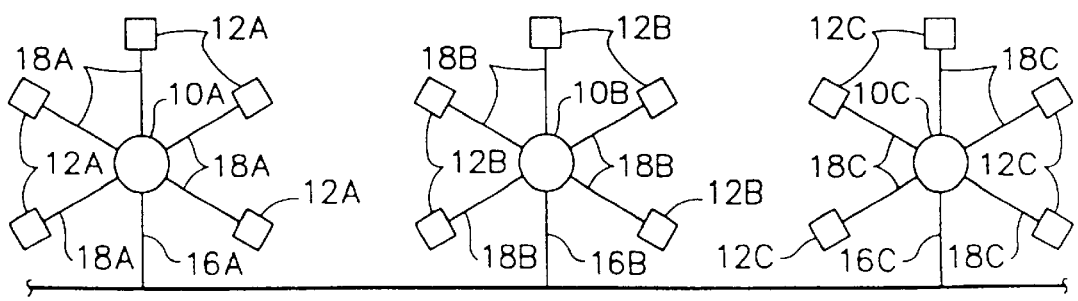
FIG. 3 is a view of a prior art bus network configuration.

In the prior art network shown in FIG. 3, if the bus 20 carries 64 channels, each hub 10 has access to all 64 channels, and each hub 10 has the capacity to handle sixteen users, then, according to the teachings of the prior art, the hubs 10 must each have a crosspoint switch of (16+64)× (16+64), (80 inputs by eighty outputs), or a switch having 6400 switch points in it.

The matrix switch in the hub 100 of the present invention differs from the prior art in that it defines users, upstream paths, and downstream paths and provides the switching to make those paths function optimally while minimizing the number of switching points. The upstream paths and downstream paths are the internodal paths 106, shown in FIG. 4. For example, for the matrix 100C, the upstream path may be the path 106BC, and the downstream path may be the path 106CD. The users are the users 102C. As shown in this figure, a user 102 includes a user interface and whatever external devices are connected to the user interface, such as a multimedia computer terminal, a video camera, a video recorder, an audio tape recorder, a video monitor, or any other device which originates or receives signals. There may also be a source 120 at the head end of the network or at some internodal path 106 in the network for bringing such things as cable television channels into the network. There are also digital ports on each hub 100, permitting the hubs 100 to be interconnected by the data link 103 in addition to the internodal paths 106.

Figure 6:
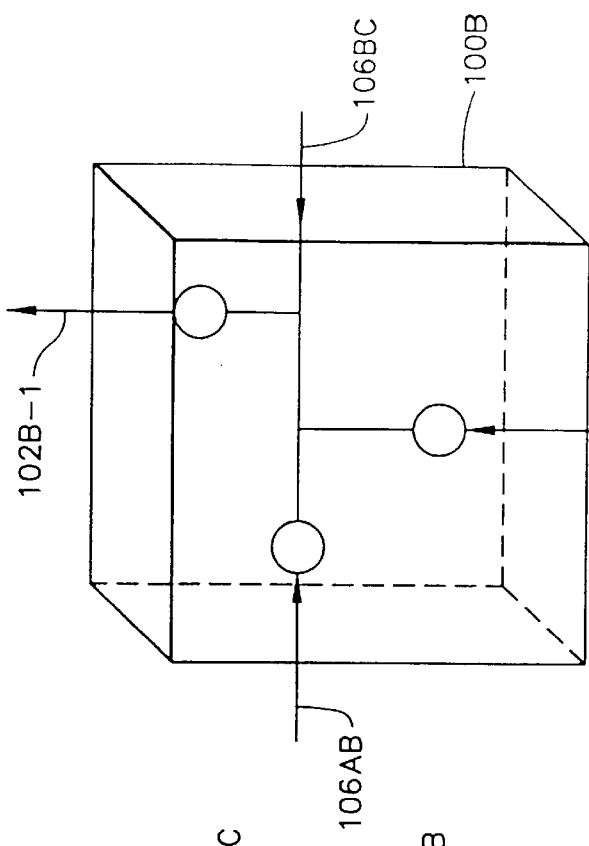
FIG. 6 is a schematic conceptualization showing some of the switching capabilities of the network of FIG. 4.
Figure 5:
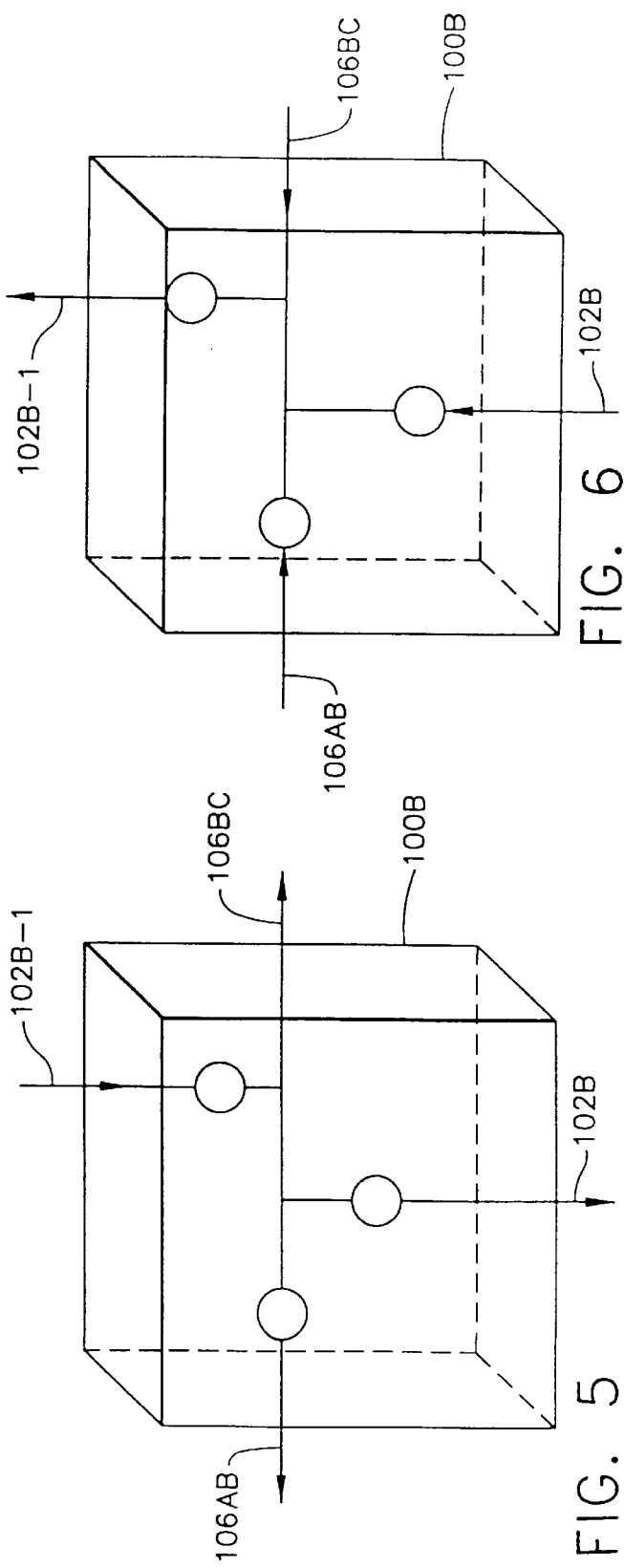
FIG. 5 is a schematic conceptualization of some of the switching capabilities of the network of FIG. 4.

FIGS. 5 and 6 summarize the switching capabilities of the matrix of switches inside the hub 100B. Looking first at FIG. 5, for any given user 102B (let's say user 102B-1) connected directly to the hub 100B, when the user 102B-1 is transmitting a signal into the hub 100B, the matrix of switches inside the hub 100B performs three independent types of switching functions for that signal. It can send the signal to any one or more of the upstream paths 106AB or not send the signal to any of the upstream paths (a first type of switching function). It can send the signal to any one or more of the users 102B connected to the same hub 100B or not send the signal to any of the users 102B on the same hub (a second type of switching function). Third, it can send the signal to any one or more of the downstream paths 106BC or not send the signal to any of the downstream paths. These three switching functions are independent, so that the user 102B-1 may be doing all three things at the same time—i.e., sending the same signal to other users on the same hub, sending the signal upstream, and sending the signal downstream. Any of those switching functions can be on or off at any given time for any given user.

FIG. 6 shows when that user 102B-1 is receiving a signal from the hub 100I. Again, it shows three different switching functions. The user 102B-1 may be receiving a signal from any one of the other users, may receive a signal from any upstream path, or may receive a signal from any downstream path. While these switching functions are also independent, the intelligence of the central processor (CPU) in the hub 100B will only allow a single user path to receive a signal from one source at a time to avoid mixing of signals.

The arrangement shown in FIGS. 5 and 6 is true for every user 102B connected to the hub 100B, so that there are effectively bi-directional on-off switches between every user 102B and every other user 102B, between every user 102B and every upstream path 106AB, and between every user 102B and every downstream path 106BC. The effect of these three different switching functions in a single matrix of switches is channel segmentation. This means that a signal coming into the hub 100B from a downstream path can be stopped at the hub 100B and replaced by a signal from a user 102B, for example. This is not possible in the prior art bus configuration of FIG. 3. It would be possible in a network such as that shown in FIG. 2, but that network is necessarily severely limited in size due to its structure.

For example, in the present invention, for a user 102A to communicate with a user 102C will tie up one channel along the paths 106AB and 106BC, but that channel will again be open in the other internodal pathways, such as 106CD, 106DE, 106EF, and so forth, so that same channel could also be used by a user 102D to communicate with a user 102F, for example.

In the prior art bus arrangement of FIG. 3, there is no distinction between upstream paths and downstream paths at the hub. With the bus 20, from each hub 10 there is only an upstream path or a downstream path—not both. The switch in the hub 101B in FIG. 3 can send signals to the bus 20 and receive signals from the bus 20. It cannot stop a signal travelling along the bus 20 or replace a signal travelling along the bus 20 with a different signal. The ability to segment channels gives the present invention much greater flexibility for a fixed size of internodal pathway 106 and a fixed size of switching matrix 100.

For example, in one embodiment of the present invention, each hub 100 is capable of connecting to 16 different users, to 64 upstream paths, and to 64 downstream paths. In the prior art bus arrangement, if there were 64 different paths on the bus 20, that would be the maximum number of signals that could be transmitted throughout the network. However, in the present invention, many more than 64 different signals can be transmitted along the network at any given time, because the 64 paths 106AB between the hubs 100A and 100B may be carrying different signals from those carried by the 64 paths 106BC between the hubs 100B and 100C, which again may be different from the signals carried along the 64 paths between the hubs 100C and 100D along the 64 paths 106CD. Thus, the channel segmentation which is made possible by the switching matrices in the hubs 100 of the present invention greatly increases the capacity of a given size of signal-carrying hardware over the prior art bus arrangement.

If the prior art hubs 10 of FIG. 3 were made so that they could segment the channels going along the bus 20, then, in accordance with the teachings of the prior art, which are that there must be an N×N crosspoint switch, with N being the number of paths into and out of the hub, each hub would have to include a much larger crosspoint switch, making it too expensive. For example, looking at the network in FIG. 3, if each hub 10 were made to handle 16 users and the hub 20 were made to carry 64 channels upstream and 64 channels downstream, then the crosspoint switch in the hubs 10 would have to be (16+64+64)×(16+64+64), or a crosspoint switch having 20,736 switch points. The preferred embodiment of the present invention shown in FIG. 7, however, by defining upstream ports, downstream ports, and user ports and arranging a plurality of crosspoint switches to meet the necessary functionality of that arrangement, requires only eight boards, each having six 8×16 crosspoint switches, or 6144 switching points (a reduction in the number of switching points of approximately 70%). This will be described in more detail below.

Figure 7:
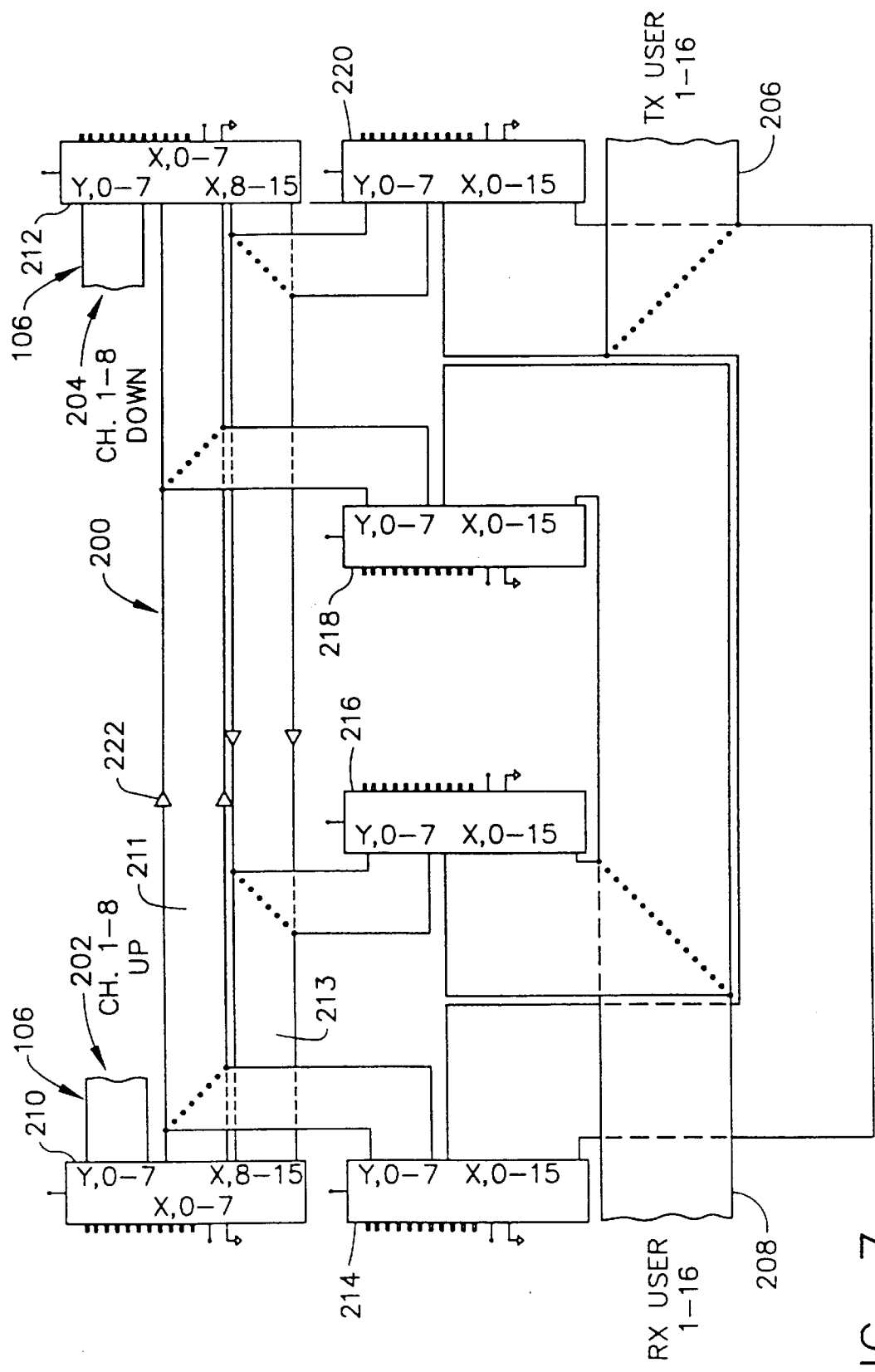
FIG. 7 is a schematic showing a preferred embodiment of the switching matrix of the present invention.

Each matrix box or hub 100 in the preferred embodiment of the present invention shown in FIG. 4, includes a central processor and includes functions in addition to the switching functions described above, and those functions will be described in detail later. For now, we will look in more detail specifically at the switching function of the matrix boxes or hubs 100. In the preferred embodiment of the present invention shown in FIG. 4, each matrix box or hub 100 includes several of the switching matrices 200 shown in FIG. 7. The switching matrix 200 shown in FIG. 7 is configured to communicate with eight bi-directional upstream paths 202 (Channels 1–8), with eight bi-directional downstream paths 204 (Channels 1–8), with 16 user input paths 206 (TX Users 1–16), and with 16 user output paths 208 (RX User 1–16). The matrix 200 and all the paths are configured to be able to handle a video bandwidth.

A preferred embodiment of the switching matrix 200, as shown in FIG. 7, includes six 8×16 crosspoint switches 210, 212, 214, 216, 218, 220. An example of a crosspoint switch which may be used is Harris model CD22M3494. Each crosspoint switch has eight Y coordinates and sixteen X coordinates as well as connecting pins for connecting to a central processor, which controls the switch. The upstream crosspoint switch 210 in the upper left corner of FIG. 7 has its Y coordinates connected to eight bi-directional upstream channels (corresponding to an internodal pathway 106), its first eight X coordinates (X0–X7) connected to eight left-to-right paths 211, and its second eight X coordinates (X8–X15) connected to eight right-to-left paths 213.

The downstream crosspoint switch 212 in the upper right corner of FIG. 7 similarly has its Y coordinates connected to eight bi-directional downstream paths 204 (corresponding to another internodal pathway 106). Its first eight X coordinates are connected to the eight left-to-right paths 211, and its second eight X coordinates are connected to the eight right-to-left paths 213. The direction of the sixteen paths between the upstream and downstream crosspoint switches 210, 212 is defined by a plurality of amplifier/buffers 222, such as Comlinear model CLC 414 or Linear Technology model LT 1230.

The first transmit crosspoint switch 214 has its Y coordinates connected to the eight left-to-right paths 211 between the upstream and downstream crosspoint switches 210, 212, and its X coordinates connected to the sixteen user inputs 206 (TX User 1–16). The user input signals are treated between the time they reach the hub 100 and the time they get to the user input points 206, as will be described later.

The second transmit crosspoint switch 220 has its Y coordinates connected to the eight right-to-left paths 213 between the upstream and downstream switches 210, 212 and its X coordinates connected to the 16 user input points 206 (TX User 1–16).

The first receive crosspoint switch 216 has its Y coordinates connected to the eight right-to-left paths 213 and its X coordinates connected to the sixteen output points to the users 208 (RX User 1–16). Again, the signals going to the users will be treated between the time they leave the output points 208 and the time they get to the user output ports on the hub 100, as will be described below.

The second receive crosspoint switch 218 has its Y coordinates connected to the eight left-to-right paths 211 and its X coordinates connected to the sixteen output points to the users 208 (RX User 1–16).

As was explained before, there are several switching possibilities for every signal coming into and leaving the matrix 200. Some examples are listed below:

1. A signal coming from a user and going to another user.

Let us assume that User 1 is sending a signal to the matrix 200. That signal arrives at the TX User 1 point, which is in communication with the X0 pin of the first transmit switch 214 and with the X0 pin of the second transmit switch 220.

The signal can get to another user by passing through either of the transmit switches 214, 220. If it goes through the first transmit switch 214, it will end up on one of the left-to-right paths 211, will then go through the second receive crosspoint switch 218, and then to the selected user through that user's RX User point. If it goes through the second transmit switch 220, it will end up on one of the right-to-left paths 213, will go into the first receive switch 216, and then out to the selected user through that user's RX User point. If it is desired to send that signal to more than one user, then the appropriate receive switch 216 or 218 can connect a signal on a single left-to-right or right-to-left path with multiple RX User points.

2. A signal coming from a user and going to an upstream path.

Again, User 1 is sending a signal to the matrix box 100, and that signal is treated and then received at the TX User 1 point. In order for that signal to get onto an upstream path, it must pass through the second transmit switch 220, which puts the signal on a right-to-left path 213, where it enters one of the X8–X15 pins of the upstream switch 210 and leaves by one of the Y pins of that switch to an upstream channel on an internodal path 106. Of course, the upstream switch 210 could be commanded to send that same signal to more than one upstream channel, if desired, although that is not likely, since upstream paths are to be conserved. Also, the signal coming from User 1 could be going to an upstream path at the same time that it is going to another user as was described in #1 above.

3. A signal coming from a user and going to a downstream path.

The signal coming from User 1 would have to pass through the first transmit switch 214, so that it ends up on a left-to-right path 211. It then reaches one of the X0–X7 pins of the downstream switch 212 and leaves that switch 212 through one of the Y pins.

4. A signal coming from an upstream path and going to a user.

A signal coming from Channel 1 of the upstream path arrives at the upstream switch 210 through one of the Y pins and leaves through one of the X0–X7 pins onto a left-to-right path 211. It is then received by the second receive switch 218, where it enters through one of the Y pins of that switch. It then leaves that switch through one or more of the X pins to one or more of the users through the RX User points 208. Again, this signal can be received by one or more users at the same time that User 1's signal is going through the matrix 200. For example, User 1 may be receiving a signal from an upstream path at the same time that it is transmitting signals into the matrix, or User 2 may be receiving User 1's signal at the same time that User 3 is receiving an upstream signal. However, the software will prevent user 2 from receiving signals from two different sources at once.

5. A signal coming from an upstream path and going to a downstream path.

Taking the same channel 1 input to the upstream switch 210, it will again leave the upstream switch 210 through one of the first eight X pins (X0–X7), will get on one of the left-to-right paths 211, and will enter the downstream switch 212 through one of its first eight X pins (X0–X7), and will leave through one of the Y pins of the downstream switch 212 to one of the downstream channels 204. It may leave through pin Y0 as Channel 1, or it may leave through another pin as another channel. Again, this shows how channel segmentation can work to increase the capacity of the system. A signal coming into the matrix 200 as Channel 1 may leave as some other channel, freeing up the Channel 1 path in the downstream portion of the network for some other purpose.

6. A signal coming from a downstream path and going to a user.

A signal comes from Channel 5 of the downstream path and enters the downstream switch 212 through the pin Y4. It leaves the downstream switch 212 through one of the second eight X pins (X8–15) and gets onto a right-to-left path 213. It is received by the first receive switch 216 and is then transmitted to one or more of the users by leaving one or more of the X pins of the receive switch 216 to the appropriate user point(s) 208.

7. A signal coming from a downstream path and going to an upstream path.

A signal comes from Channel 5 of the downstream path and enters the downstream switch 212 through the pin Y4. As in the previous example, it leaves the downstream switch 212 through one of the pins (X8–15) and gets onto a right-to-left path 213. It is received by the upstream switch 210 at one of the pins (X8–15) and leaves through one of the Y pins.

Figure 7A:
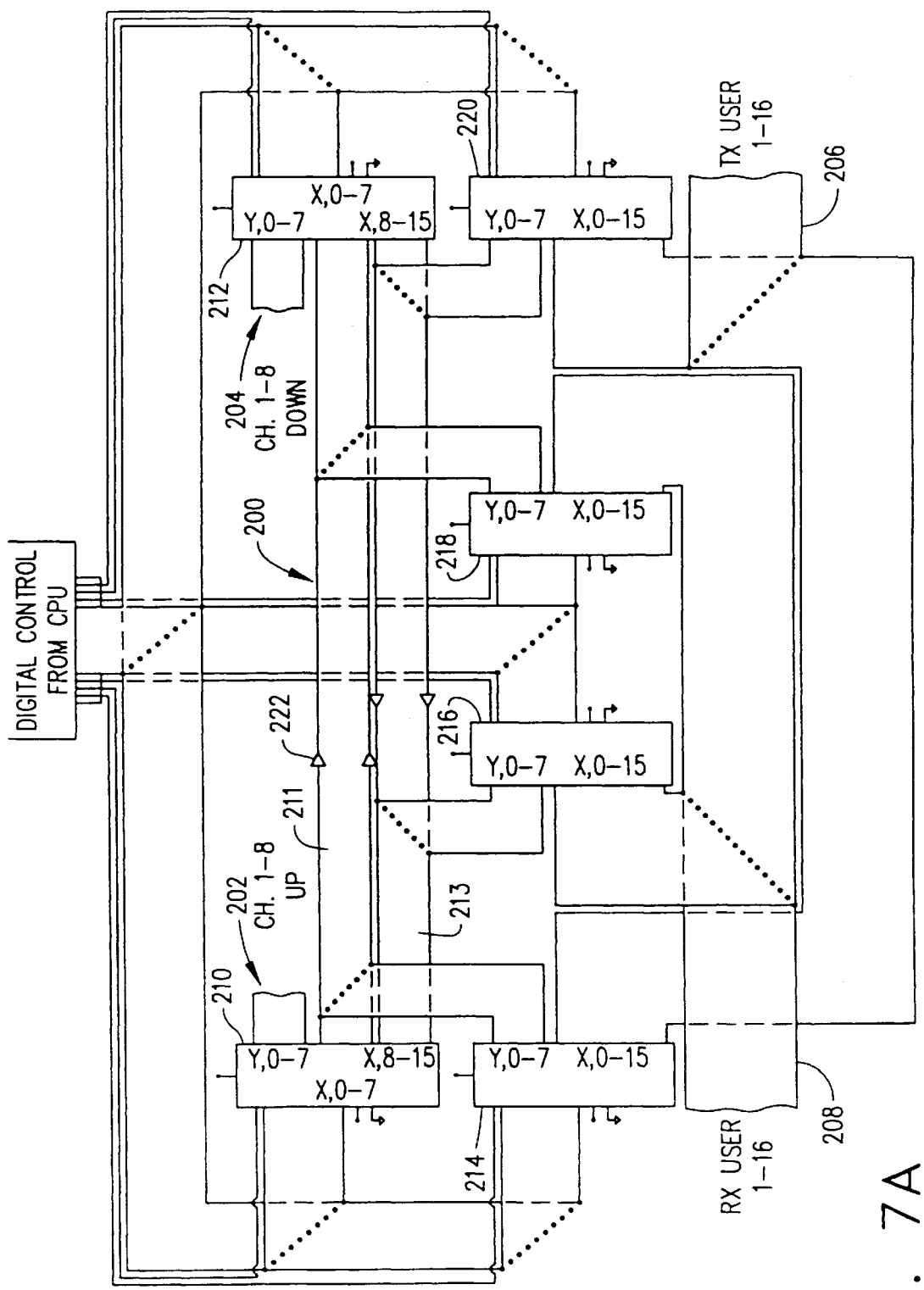
FIG. 7A is the same schematic as FIG. 7 but with the central processor (CPU) shown with its connections to the switches in the matrix.

FIG. 7A shows the same matrix 200 as does FIG. 7, but it also shows the central processor and its digital control connections to the analog crosspoint switches in the matrix 200.

Figure 8:
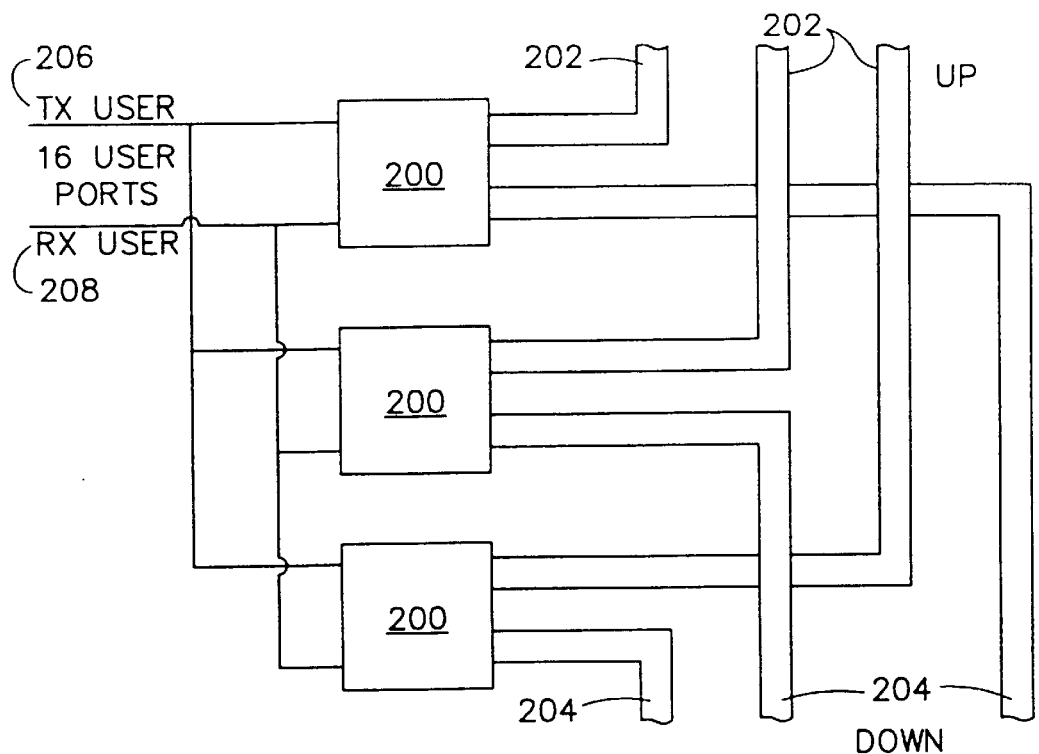
FIG. 8 is a schematic showing how the switching matrices of FIG. 7 can be interconnected to add more upstream and downstream channels.

In the matrix box or hub 100 are a plurality of these matrices 200, interconnected as shown in FIG. 8. The same TX User points 206 communicate with all the matrices 200 in the box 100, and the same RX User points 208 communicate with all the matrices 200 in the box 100. Each matrix 200 connects to eight different up channels 202 (creating part of an internodal path 106 which will go to another matrix box) and to eight different down channels 204 (creating part of another internodal path 106 to a different box), so that, by stacking the matrices 200, the box 100 can handle more channels. In one of the preferred embodiments, there are eight of these matrices 200 stacked to permit communication with 64 upstream channels 202 and 64 downstream channels 204.

In the first preferred embodiment, analog video signals are switched on one set of matrices 200, and analog audio signals are switched on a different set of matrices 200, so, for simultaneous, bi-directional transmission of audio and video among 16 users and 64 channels, there are eight interconnected matrices 200 for the video signals and eight interconnected matrices 200 for the audio signals in a single box 100. All the matrices 200 in a single box 100 are controlled by the central processor for that box 100.

Looking at FIG. 4 again, between every user 102 or source 120 and the network is a user interface (part of 102). In the preferred embodiment, signals travel along the internodal paths 106 in common mode. Signals travel from the hub 100 to users 102 along the pathways designated as 104, which are preferably twisted pair cable. It is also possible for signals to travel directly from one user interface 102 to another user interface 102 over twisted pair cable. In the present invention, when signals are sent over twisted pair wiring, they are sent in differential mode, so the user interfaces 102 and the matrix boxes 100 convert outgoing signals from common mode to differential mode before sending the signals out over twisted pair wiring and convert signals from differential mode to common mode when receiving signals from twisted pair wiring.

It is anticipated that the wiring 104 (referring to FIG. 4) between the user interface 102 and the hub 100 would include four twisted pairs of wire, preferably terminating in an RJ45 connector with eight pins. In the preferred embodiment, pins 1 and 2 transmit audio with control data, pins 4 and 5 transmit video, pins 3 and 6 receive audio with control data, and pins 7 and 8 receive video. Thus, in this way, simultaneous, bi-directional, real-time audio, video, and data signals can be carried in one eight-wire twisted pair cable. In the preferred embodiment, the internodal pathways 106 with 64 bi-directional common mode audio and video channel transmission capability are made up of 128 cables.

Figure 11:
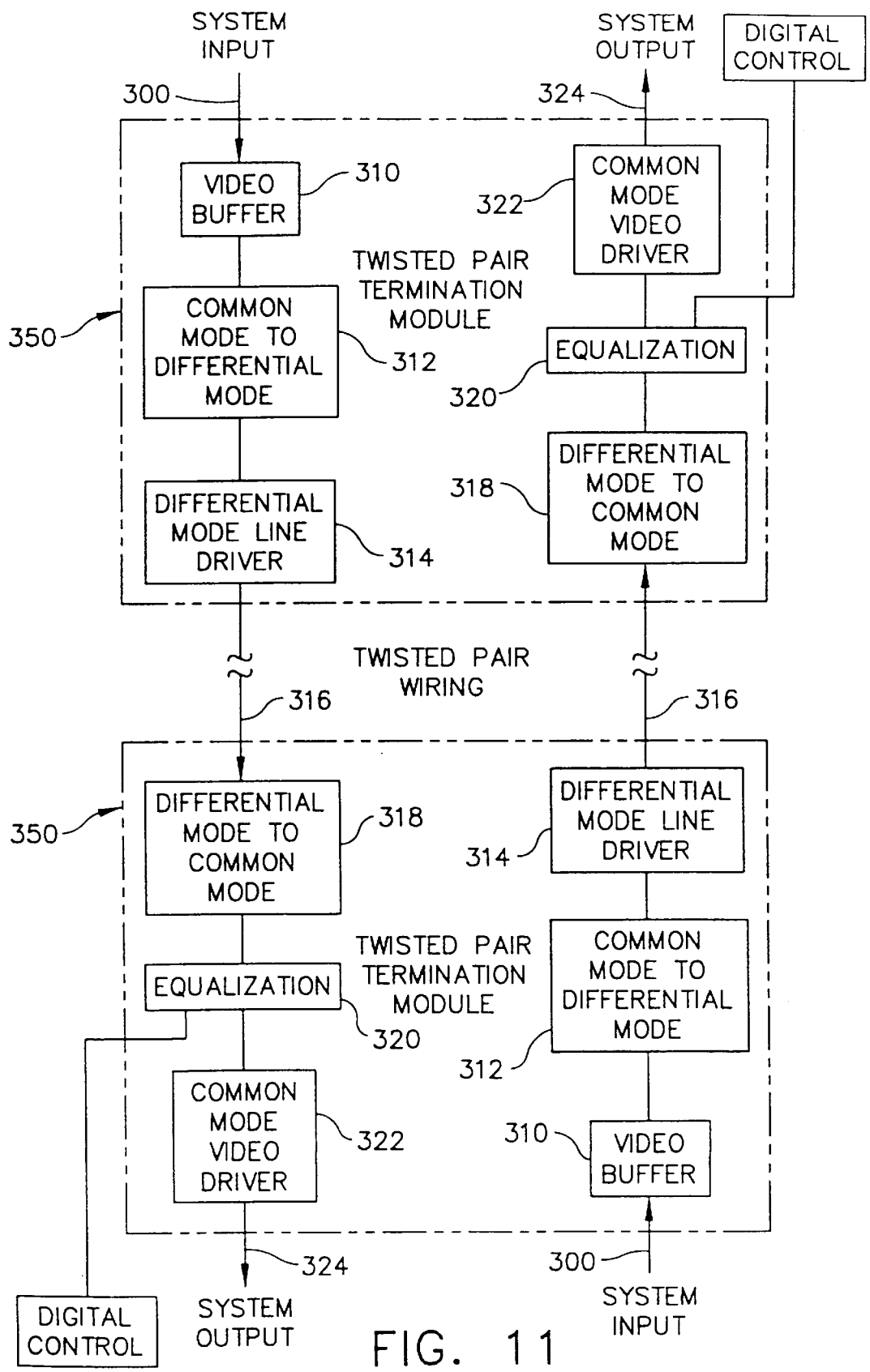
FIG. 11 is a schematic showing the preferred embodiment of how a signal travels in the network of the present invention from one twisted pair termination module to another over twisted pair wiring.

For ease of explanation, we will refer to the portions of the user interface boxes 102 and of the matrix boxes 100 which take care of this signal conversion as twisted pair termination modules 350. It would also be possible for these termination modules 350 to function independently, outside of the boxes 100, 102, as required. FIG. 11 shows two twisted pair termination modules 350 and the manner in which they handle signals.

Figure 9:
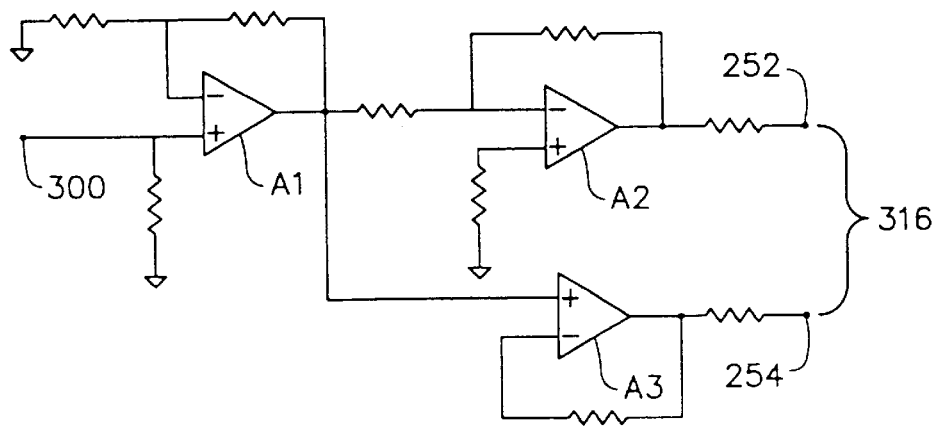
FIG. 9 is a schematic of the circuitry a signal passes through as it leaves the hub of FIG. 4 over twisted pair wiring.

Signal coming in from external device:

Referring now to FIG. 11, there are two twisted pair termination modules 350 connected together by twisted pair wiring 316. At the top left portion of the upper twisted pair termination module 350 is a system input 300. This is an input in common mode (for example, a standard single-ended NTSC signal). It may be coming from a video camera, a cable television channel, a microphone, or another source. The signal goes through a video buffer 310, is converted to differential mode by a converter 312, goes through a differential mode line driver 314, which is an operational amplifier, and then out over the twisted pair wiring 316. The circuitry which performs these functions is shown in FIG. 9 and is described later.

Figure 10:
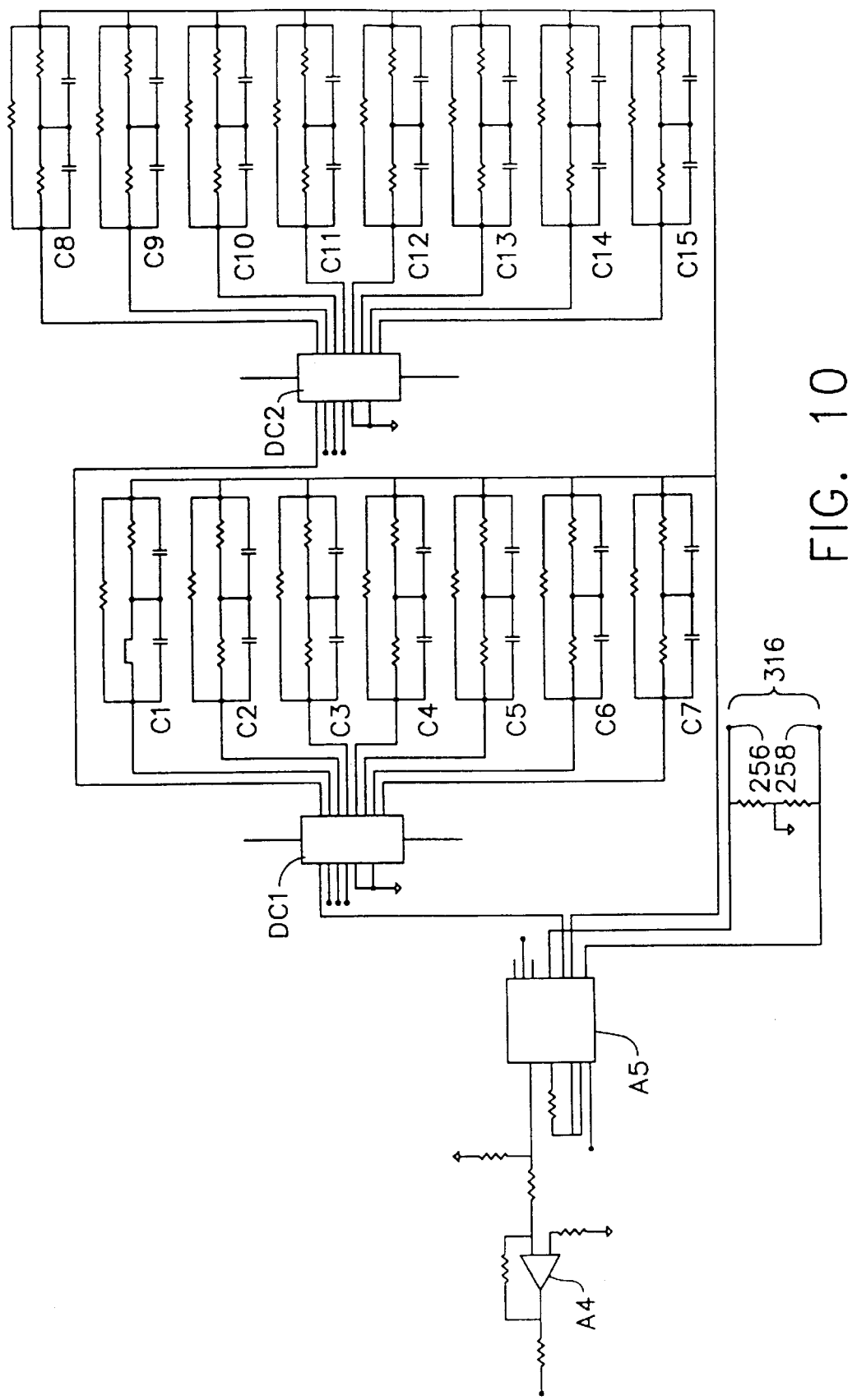
FIG. 10 is schematic of the circuitry a signal passes through as it arrives at the hub of FIG. 4 over twisted pair wiring.

Signal coming in from twisted pair wiring:

Following that twisted pair wiring 316 to the left side of the lower twisted pair termination module 350, we see the process that occurs when a differential signal is received at that module 350. First, the signal is converted from differential mode to common mode at a converter 318. It goes through an equalization circuit 320 to compensate for signal degradation, it goes through a common mode video driver 322, and then out to an external output 324. The circuitry which performs these functions is shown in FIG. 10 and is described later.

Because of the equalization circuit 320, it is possible to have simultaneous, bi-directional signals passing through two twisted pairs in the same cable. The present invention has overcome the problems of signal degradation and crosstalk that plagued prior art devices.

The right-hand side of FIG. 11 is the same as the left-hand side but reversed. Looking at the lower right hand corner of the lower twisted pair termination module 350, there is again a system input 300, which goes through a video buffer 310, through a converter 312 which converts the signal from common mode to differential mode, through a differential mode line driver 314, and out over the twisted pair wiring 316. When the differential signal is received over the twisted pair wiring 316 on the right side of the upper module 350, it is converted from differential mode to common mode at the converter 318, the signal is equalized 320, and the signal passes through a common mode driver 322 to an output 324, which may be a video monitor, a speaker, and so forth. It can be seen in FIG. 11 that the equalization circuits are digitally controlled. This control would preferably come from the central processor in the box in which the circuitry is located.

FIG. 9 shows the circuit that is used for signals which come in in common mode and go out in differential mode over twisted pair wiring. It functions as follows: The signal enters at the port 300 (corresponding to the system input 300 in FIG. 11), and passes through the operational amplifier A1, which provides signal level and impedance matching with the external system. The second operational amplifier A2 is wired as an inverter and generates the negative component of the differential signal, while driving the line through an impedance matching resistor. The third operational amplifier A3 is wired as a non-inverting driver, and generates the positive component of the differential signal, while driving the line through an impedance matching resistor. The negative component of the differential signal leaves at the point 252 onto one of the twisted pair wires 316, and the positive component of the differential signal leaves at the point 254 onto the other of the twisted pair wires 316. FIG. 10 shows the circuit that is used for signals coming into the twisted pair termination module 350 as differential signals over twisted pair wiring 316 and leave in common mode. It functions as follows: The differential signal arrives on two twisted pair wires 316 at the points 256, 258. The operational amplifier A5 provides impedance matching with the input resistors, signal level matching, amplitude/frequency compensation (equalization), and conversion of the differential signal to a common mode signal. The cells C1 to C15 are composed of passive circuits and are used by the A5 amplifier to provide amplitude/frequency compensation (equalization). Each cell is tuned to a specific length of twisted pair wire. The central processor knows the length of the twisted pair wire 316 coming to the points 256, 258 and digitally controls the analog multiplexers DC1 and DC2, which pilot the cells C1 to C16 to provide the proper compensation for that length. Amplifier A4 is the output driver, which interfaces with the external system.

Figure 12:
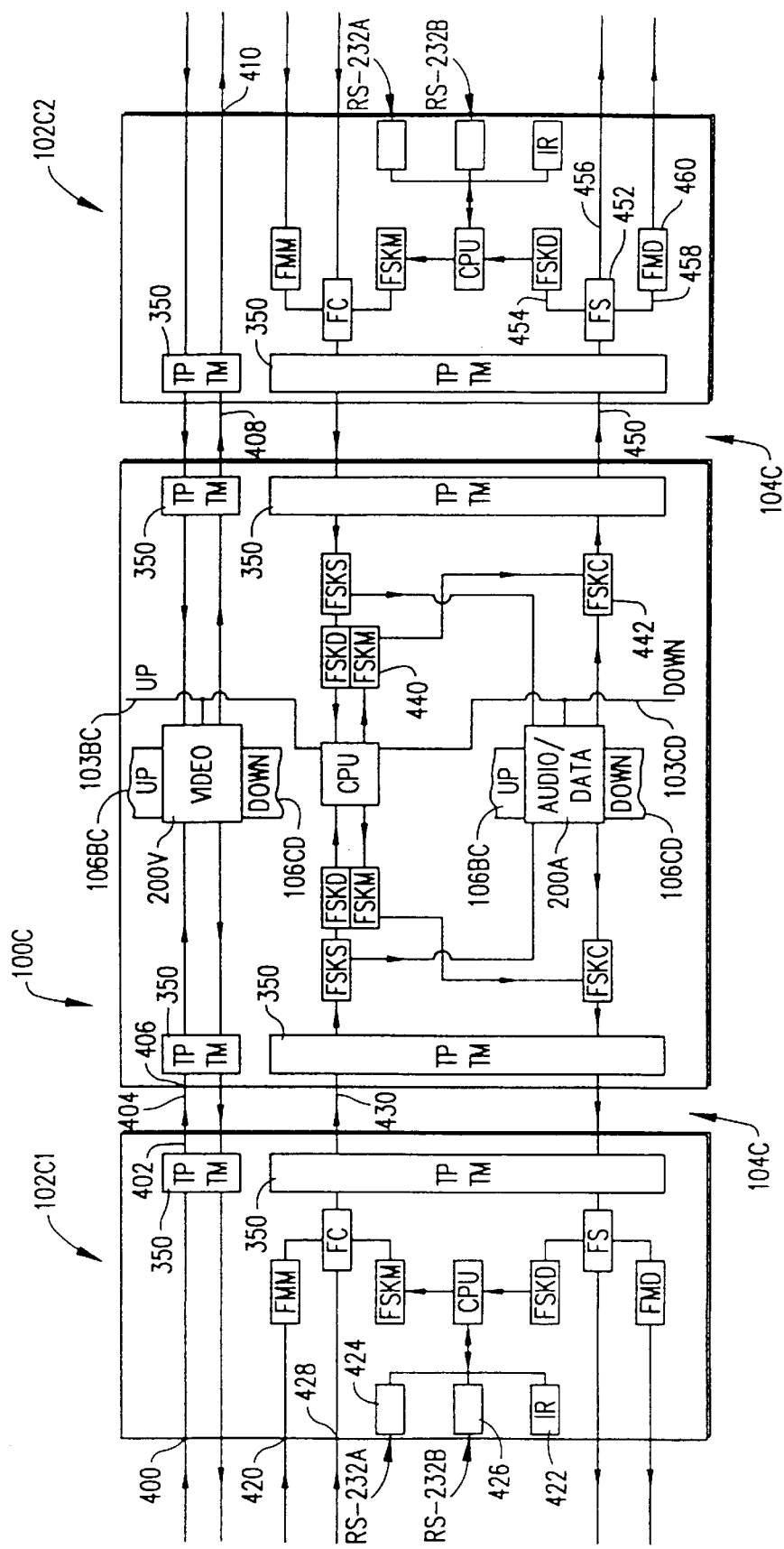
FIG. 12 is a schematic showing the flow of video, audio, and data signals from a user interface, through a hub (including the switching matrix), to another user interface.

FIG. 12 is a schematic view which helps clarify how the twisted pair termination modules 350 function in the user interfaces 102 and the matrix boxes 100 and how audio, video, and data signals travel throughout the network of FIG. 4. To help see what is upstream and what is downstream, the matrix box or hub in FIG. 12 is labelled as box 100C, the upstream channels are in the path 106BC, going to the hub 100B, and the downstream channels are in the path 106CD, going to the hub 100D. Two users 102C1 and 102C2 are shown, each connected by two pairs of twisted pair wiring to the hub 100C. Of course, every one of the users 102C connected to the hub 100C would have a similar connection.

Transmission of video signal through the network:

Let's look first at the upper left-hand portion of the user interface 102C1, where there is video input to the user interface 102C1 at the point 400. This video input is in common mode. It may be coming from a video camera, cable television, or a video recorder, for example, over coaxial cable. The analog video signal is routed through a twisted pair termination device 350, which has been described with reference to FIGS. 9, 10, and 11. The video signal then leaves the termination device 350 at the point 402 as a differential signal. It travels over the twisted pair 404 and is received at a user input port 406 of the hub 100C, where it is routed through another twisted pair termination device 350, which converts the signal to common mode and equalizes the signal. The video signal then arrives at a TX User point at the matrix 200V, which is the same as the matrix 200 which was described with respect to FIG. 7. The video signal is switched through the matrix 200V, with the central processor of the box 100C closing switch points in the crosspoint switches as needed to route the signal in the correct direction. If the signal is going to an upstream channel 106BC, no further signal treatment is done, and the signal leaves the box 100C via one of the upstream channel ports. Similarly, if the signal is going to a downstream channel 106CD, no further signal treatment is done, and the signal leaves the box 100C via one of the downstream channel ports. If the signal is to go to another user connected to the box 100C, such as user 102C2, shown on the right of the hub 100C, then the signal leaves the matrix 200V through the appropriate RX User point and passes through another twisted pair termination module 350, where it is converted to differential mode and sent out over the twisted pair 408. The signal is received at the user interface 102C2, goes through another twisted pair termination module 350, where it is converted back to common mode, is equalized, and leaves the user interface 102C2 through the port 410 to a video recorder, video monitor, or other device for receiving video signals.

Transmission of audio and data signals through the network:

Looking again at the left-hand side of the first user interface 102C1 in FIG. 12, an analog audio signal enters the user interface at the port 420. This would actually be two audio signals, left and right stereo, coming in from a video camera with sound, an audio or video tape recorder, or other audio source in common mode. Also, data may be input to the user interface 102C1 at four different points. System control data in the form of infrared remote control signals can enter through the IR window 422. Other digital control data, such as mouse or keyboard commands, can be input via the ports 424 or 426. It is also possible to input external carrier frequencies through the port 428.

The left and right audio signals coming in at the port 420 are frequency modulated at the frequency modulator (FMM). System control data coming in through ports 422, 424, or 426 is first routed through the central processor for the user interface (CPU) and then, in the form of a digital signal to the frequency shift key modulator (FSK M), which sends it on to the frequency coupler (FC). The frequency coupler couples the audio signals with the data signal. If a signal has come in through the external carrier frequency port 428, that signal goes directly to the frequency coupler (FC), where it is coupled together with the audio and control data. This common mode audio/data signal then goes into a twisted pair termination module 350, where it leaves over the twisted pair 430 in differential mode and arrives at the hub 100C. It goes through another twisted pair termination module 350, where it is converted to common mode. This combined audio/data signal then goes through a frequency shift key separator (FSK S), where the system control data (which came into the user interface 102C1 through the ports 422, 424, or 426) is stripped off as a digital signal and routed to the central processor (CPU) of the hub 100C, which controls the audio and video matrices 200A and 200V in the hub box 100C. The multiplexed audio/external carrier frequency signal passes through the audio matrix 200A and can go to up channels via the internodal path 106BC, to down channels through the internodal path 106CD, or to users 102C connected to the same box 100C by going to the frequency shift key coupler (FSK C) 442.

The central processor (CPU) acts on the digital control signal it receives from the frequency shift key demodulator (FSK D) and on any digital signals it receives from upstream and downstream digital links 103. If the control signal is a routing signal, for example, indicating that the user at 102C1 wants to set up communication with the user at 102C2 and with upstream users and downstream users, the CPU controls the necessary video and audio matrix switches in its own box 100C to set up those routes. It will also send signals to the CPUs of upstream matrix boxes (such as 100 A and B) and downstream matrix boxes (such as 100 D and E) via the appropriate digital links 103 in order to cause those CPUs to close the appropriate switches in their matrix boxes 100 for routing to more distant users. If the CPU at the box 100C receives a digital control signal from another user 102C or from an upstream or downstream box via the data link 103, or if the CPU at the box 100C generates its own signal which should be passed on to a user 102C at the box 100C (such as a signal to control the user interface 102C2 or the video camera connected to user interface 102C2), it will send the control signal or signals through a frequency shift key modulator 440 (FSK M), which sends the information on to the frequency shift key coupler (FSK C) 442, where the information signal component is multiplexed with the signals leaving the audio matrix 200A toward the user interface 102C2. It is clear from the foregoing description that the control data does not travel through the matrix with the audio signals and the external carrier frequencies. This allows isolating the system control data signal on its arrival at the hub 100C. The original signal is read, its instructions are carried out, and that signal is terminated. The CPU then reformats the signal or generates its own signal and, if necessary, forwards the outgoing control signal in the appropriate direction. The combined audio/data signal leaving the frequency shift key coupler 442 again goes through a twisted pair termination module 350, leaves the hub 100C via an output port, over the twisted pair 450 to the user interface 102C2, where the analog audio/data signal goes through the receiving side of another twisted pair termination module 350, on to a frequency separator (FS) 452, which separates out the control signal onto the path 454, separates out the external carrier frequency onto the path 456, and sends the multiplexed audio signal out onto the path 458. The external carrier frequency leaves the user interface 102C2 with no further signal treatment. The multiplexed audio signal is demultiplexed by the frequency modulation demodulator 460 and leaves as separate left and right audio signals. The control data on the path 454 then passes through a frequency shift key demodulator (FSK D) which puts it back into digital form and then to the CPU for the user interface 102C2. The CPU then sends any control signals which need to go out to a device via one of the digital input/output ports RS-232A, RS-232B, or the infrared window IR.

It will be clear from the above description that this is a bi-directional network, so, for example, the second user interface 102C2 can send signals out in the same way the first user interface 102C1 did, and the first user interface 102C1 can receive signals in the same way that the second user interface 102C2 did. Similarly, signals may come into the matrix box 100C from upstream and downstream in the same manner that they leave.

Figure 13:
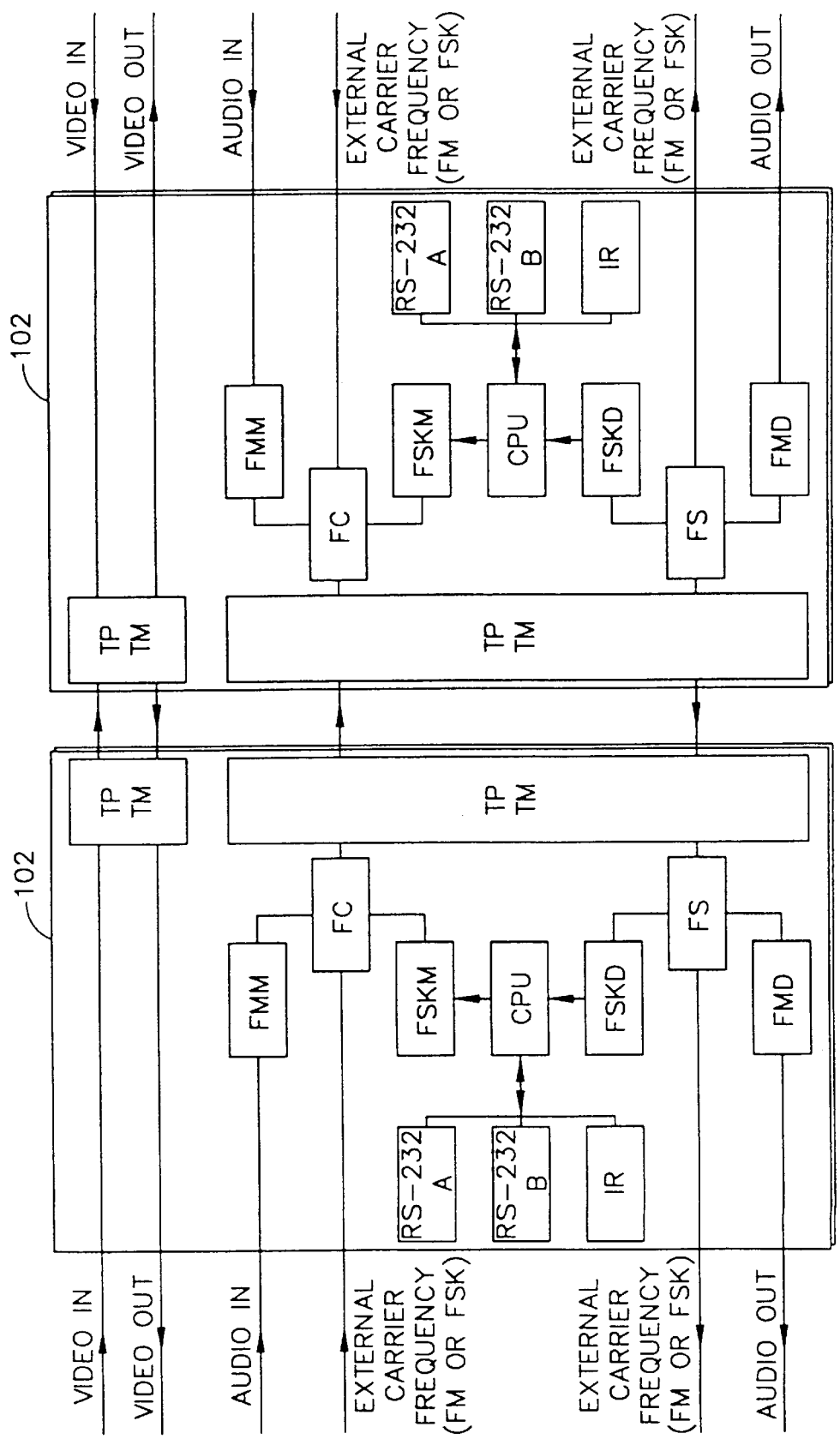
FIG. 13 is a schematic showing the flow of video, audio, and data signals directly from user interface to user interface.

FIG. 13 shows a direct connection between user interfaces 102. These user interfaces 102 stand alone and are not connected to any hub. Since this is simply a point-to-point transmission, no switching is required. In this case, the video signal is converted from common mode to differential mode to go over the twisted pair wiring between the user interfaces 102 and then back to common mode upon reception. The audio signals are multiplexed and combined with the data signals. The combined audio/data signal is converted to differential mode for transmission over twisted pair. Upon reception over twisted pair, the combined audio/data signal is converted back to common mode, the data is separated out, and the audio is demultiplexed.

New Embodiment

Figure 14:
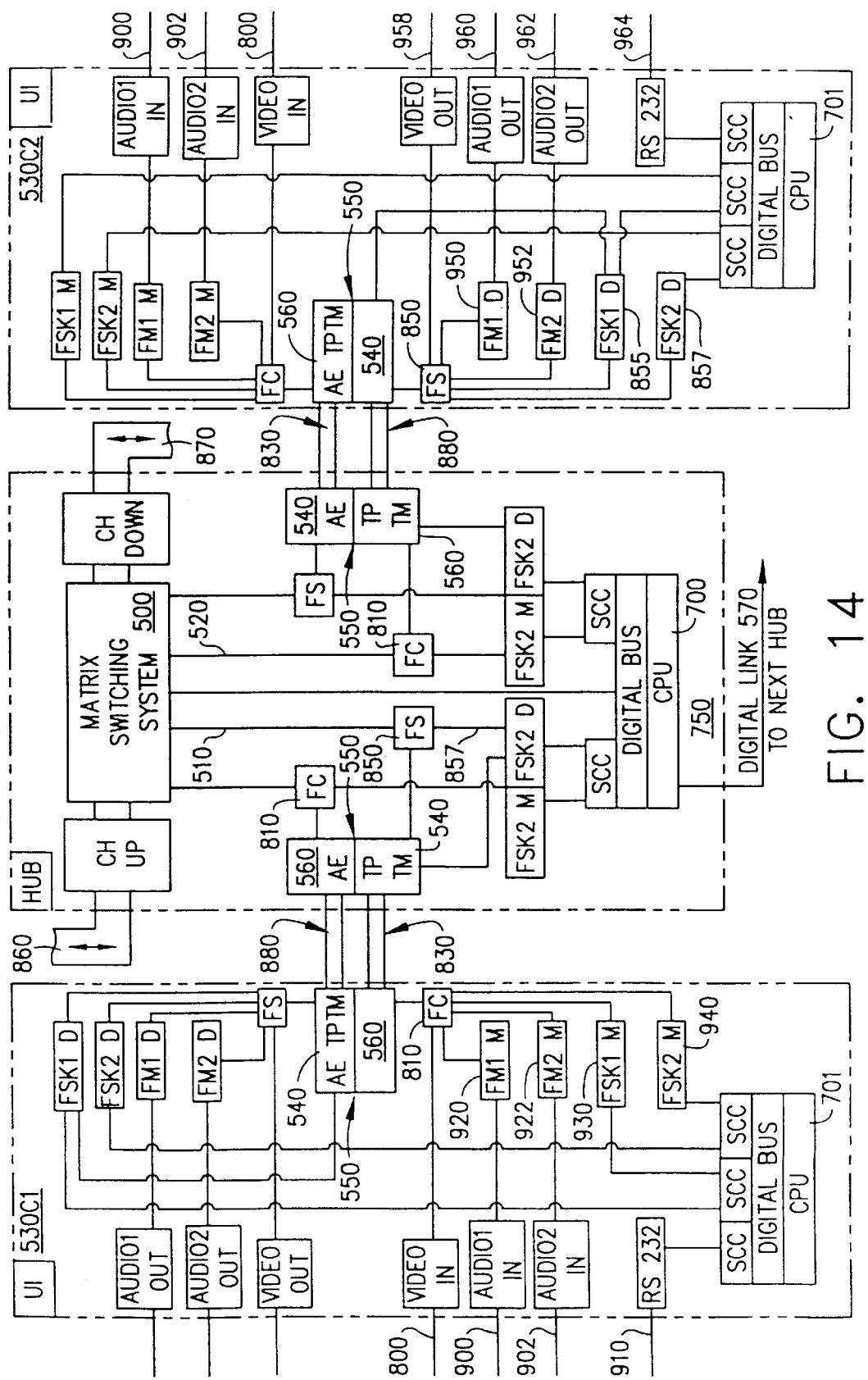
FIG. 14 is a schematic of another embodiment of the present invention showing the flow of audio, video, and data signals from a user interface, through a hub, to another user interface.

Another embodiment of a switching matrix made in accordance with the present invention is shown in FIG. 14. FIG. 14 shows a hub 750 and two users 530C1 and 530C2 connected to the hub 750. "Up" Channels 860 and "Down" Channels 870 from the switching matrix 500 permit the hub 750 to be connected to other hubs. In this preferred embodiment, there are 16 user paths 830 toward the hub 750, 16 user paths 880 away from the hub, eight bi-directional "up" channels 860 and eight bi-directional "down" channels 870. (Only two users are shown in FIG. 14, but the preferred embodiment contemplates sixteen users being connected to the hub.) The switching matrix 500 in the hub 750 of FIG. 14 accomplishes essentially the same functions as the matrix 200 of FIG. 7, but with fewer switch points.

If the prior art hubs 10 of FIG. 3 were made so that they could segment the channels going along the bus 20, then, in accordance with the teachings of the prior art, which are that there must be an N×N crosspoint switch, with N being the number of paths into and out of the hub, each hub would have to include a much larger crosspoint switch, making it too expensive. For example, looking at the network in FIG. 3, if each hub 10 were made to handle 16 users and the bus 20 were made to carry 8 channels upstream and 8 channels downstream, then the crosspoint switch in the hubs 10 would have to be (16+8+8)×(16+8+8), or a crosspoint switch having 1,024 switch points. The embodiment of FIG. 14 has three 8×16 crosspoint switches 3(8×16) and 16 two-way switches 16(2×1) to accomplish the same function, or 416 switching points. This is less than half the switching points that would be required by an N×N crosspoint switch.

Combined audio, video and data signals can be transmitted from the user interfaces 530C1 and 530C2 to the matrix system 500 of the hub 750 along the user-to-hub paths 830 where they can go to another user along a hub-to-user path 880 or can go out on an up channel 860 or on a down channel 870. Signals can come in to the matrix system 500 on an up channel 860 and can go out to a user 530C1 or 530C2 or can go out on a down channel 870. Signals can also come in to the matrix system 500 on a down channel 870 and go out to a user 530C1 or 530C2 or go out on an up channel 860. All of the switch points in the matrix system 500 are digitally-controlled by the central processing unit (CPU) 700. A user controls the switching and the routing of the signals in the system by inputting commands from the keyboard. These commands travel along a user path 830 to the hub 750, where they are interpreted, causing the CPU 700 to give the appropriate command to the matrix switching system 500.

Figure 15:
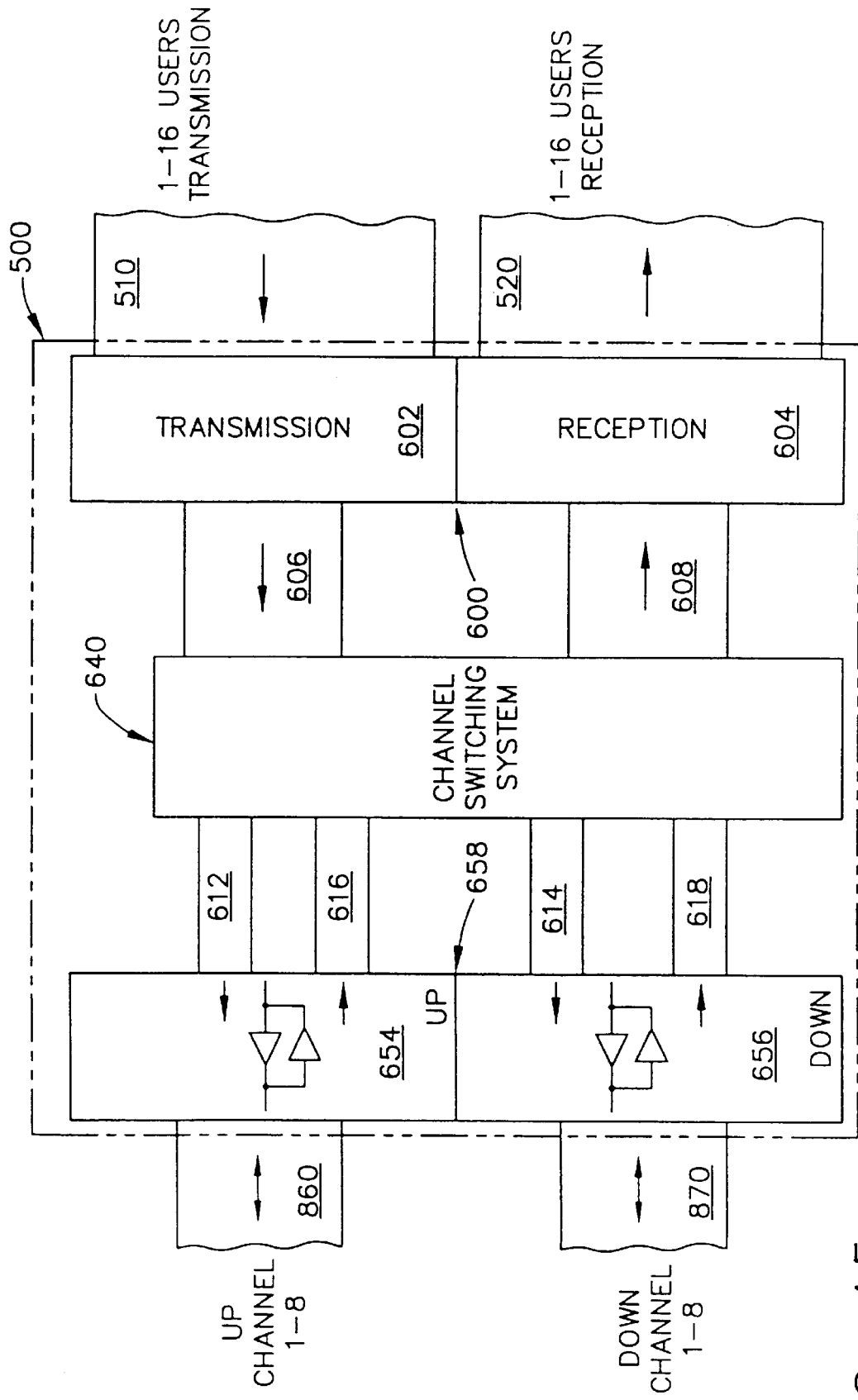
FIG. 15 is a schematic showing the matrix switching system in the hub of FIG. 14.

The matrix switching system 500 is shown in greater detail in FIG. 15. The matrix switching system 500 includes a user switching system 600 which has a transmission portion 602 and a reception portion 604. It also includes a channel switching system 640 and a channel twisted pair line interface 658 which has an up channel portion 654 and a down channel portion 656. Signals which arrive at the matrix 500 along any of the sixteen user transmission paths enter the transmission portion 602 of the user switching system 600. The transmission portion 602 includes switches which selectively route these incoming signals along eight transmission paths 606 to the channel switching system 640, which includes switches that can route the signals to an up channel twisted pair line interface 654 along a transmission path 612 and/or to a down channel twisted pair line interface 656 along a transmission path 614. The eight transmission paths 612 lead to the eight up channel paths 860, respectively, and the eight transmission paths 614 lead to the eight down channel paths 870, respectively. No switching or routing occurs in the channel twisted pair line interface 658. The interface 658 is simply used to convert outgoing signals from common mode to differential mode and to convert incoming signals from differential mode to common mode, because signals travel along the channel paths 860, 870 in differential mode, but they travel through the matrix switching system 500 in common mode.

Signals received at the matrix 500 from an up channel path 860 are converted to common mode in the "up" channel portion 654 of the twisted pair line interface 658 and arrive at the channel switching system 640 along a respective up channel reception path 616. Signals received at the matrix 500 from a down channel path 870 are converted to common mode in the "down" channel portion 656 of the twisted pair line interface 658 and arrive at the channel switching system 640 along a respective down channel reception path 618. The channel switching system 640 equalizes the incoming signal and routes it to a user reception channel 608 or to an up channel transmission path 612 or to a down channel transmission path 614, depending on the command received by the CPU 700. Signals traveling on a user reception channel 608 enter the reception portion 604 of the user switching system 600 where they are routed to one or more user reception paths 520. The details of the modules in FIG. 15 are shown in subsequent figures. Signal equalization will also be described in more detail later.

Figure 16:
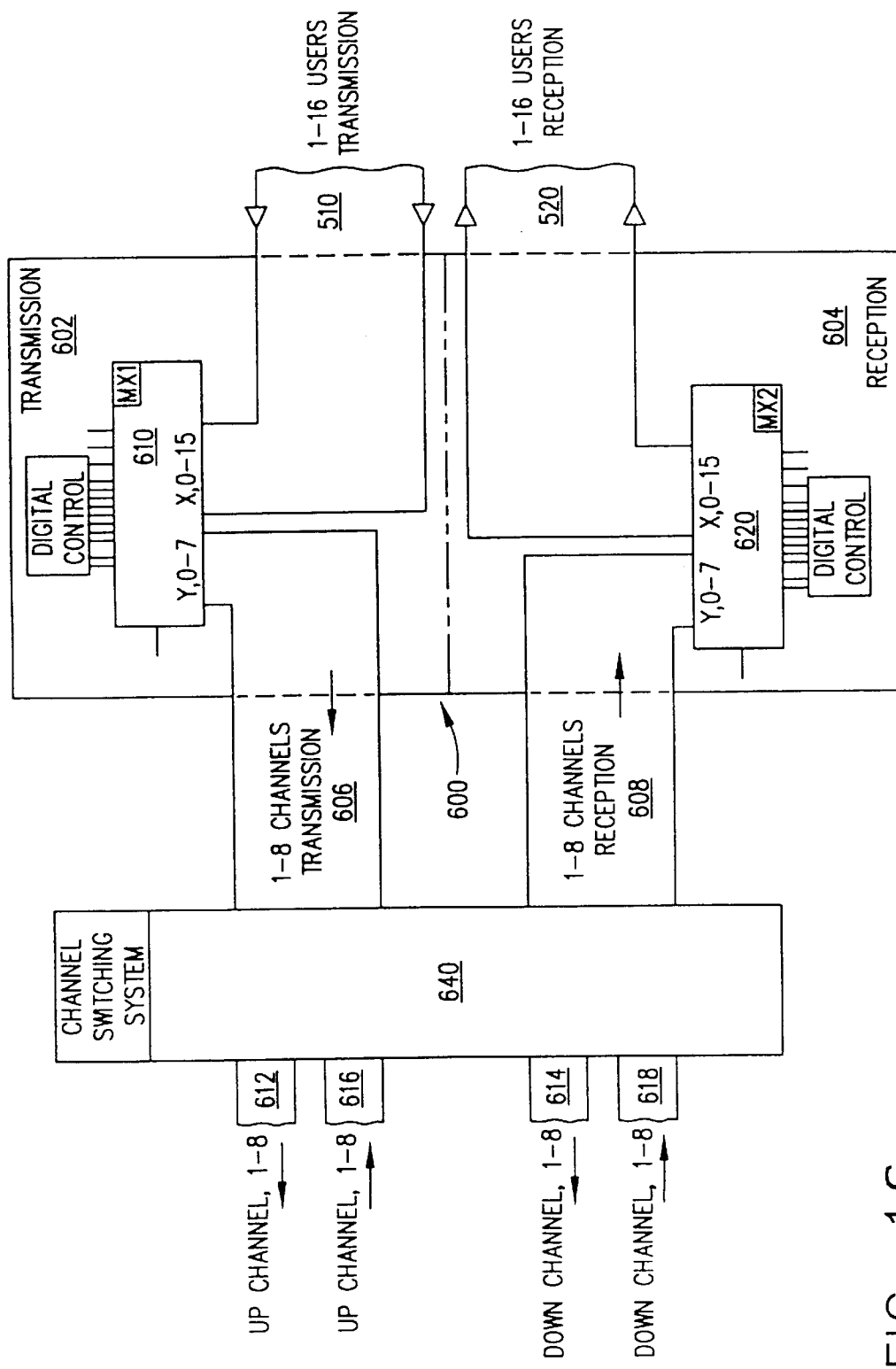
FIG. 16 is a schematic showing the details of the user switching system portion of FIG. 15.

FIG. 16 shows the user switching system 600 of FIG. 15 in greater detail. The transmission portion 602 is shown in the top half of the user switching system 600 and the reception portion 604 is shown in the bottom half. The transmission portion 602 includes a digitally-controlled 8×16 crosspoint switch 610. Signals arriving along the user transmission paths 510 travel to the crosspoint switch 610. From the crosspoint switch 610, there are eight paths 606 to the channel switching system 640. The crosspoint switch 610 can connect any incoming user path 510 with any one or more of the channel transmission paths 606.

The reception portion 604 of the user switching system 600 includes a digitally-controlled 8×16 crosspoint switch 620. The reception portion 604 receives signals from the channel switching system 640 along the eight reception channels 608 and switches them to one or more of the sixteen user reception paths 520.

Figure 17:
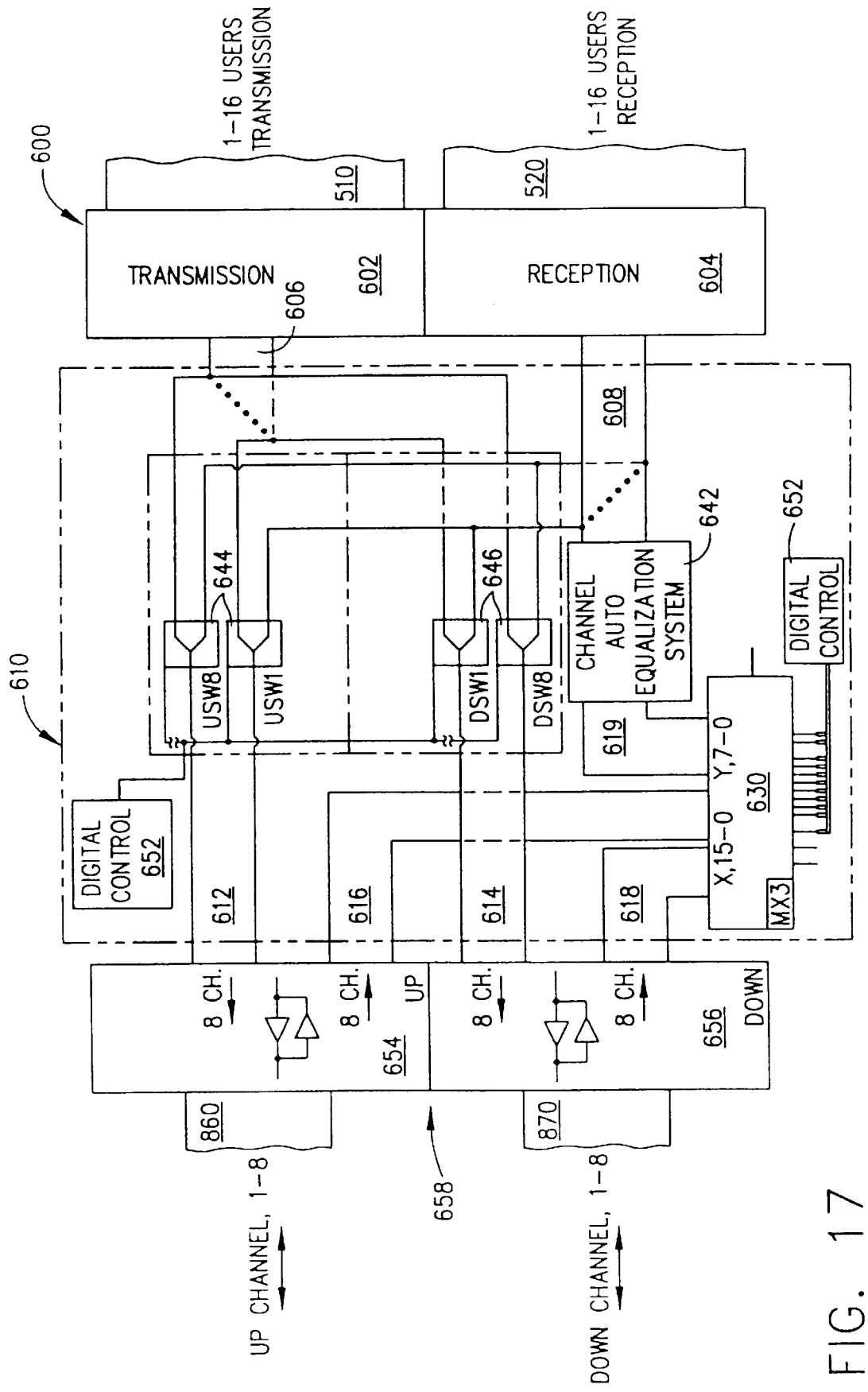
FIG. 17 is a schematic showing the details of the channel switching system portion of FIG. 15.

FIG. 17 details the channel switching system 640 of FIG. 15. Signals being transmitted from users leave the user switching system 600, travel along the transmission channels 606, and enter the channel switching system 640. Signals can also enter the channel switching system 640 from the up channel portion 654 of the twisted pair line interface 658 along paths 616 and from the down channel portion 656 of the twisted pair line interface 658 along paths 618. Signals arriving at the channel switching system 640 from up or down channels along the paths 616, 618 go to a channel auto equalization system 642. Signals arriving at the channel switching system 640 can be routed to up or down channels or to users through the up and down channel switches 644, 646, respectively. The up channel two-way switches 644 are used to route signals from the transmission portion 602 of the user switching system 600 to the up channel transmission paths 612 and to route signals from the channel auto-equalization system 642 to the up channel transmission paths 612. The down channel two-way switches 646 are used to route signals from the transmission portion 602 of the user switching system 600 to the down channel transmission paths 614 and to route signals from the channel auto-equalization system 642 to the down channel transmission paths 614. The up channel transmission paths 612 take the signals through the up channel twisted pair line interface 654 to the up channel paths 860. The down channel transmission paths 614 take the signals through the down channel twisted pair line interface 656 to the down channel paths 870.

Signals arriving at the channel switching system 640 along up channel reception paths 616 and down channel reception paths 618 go to the digitally-controlled 8×16 crosspoint switch 630 which sends them along one of eight paths 619 to the channel auto-equalization system 642.

The channel auto-equalization system 642 counteracts the signal degradations that occur during transmission along twisted pair wiring. The details of auto-equalization in the channel switching system 640 are identical to the auto-equalization in the reception portion 540 of the twisted pair termination modules 550 which are shown in FIG. 14. The auto-equalization in the twisted pair termination modules 550 will be described in the description of FIG. 20.

Signals leaving the channel auto-equalization system 642, can go to the reception portion 604 of the user switching system 600 along paths 608. The signals can also continue to travel between the hubs by traveling through selected up and down channel switches 644, 646 to the paths 612 to the up channels or to the paths 614 to the down channels. The up channel and down channel two-way switches 644, 646 and the crosspoint switch 630 are digitally-controlled by the central processing unit (CPU) 700.

Figure 18:
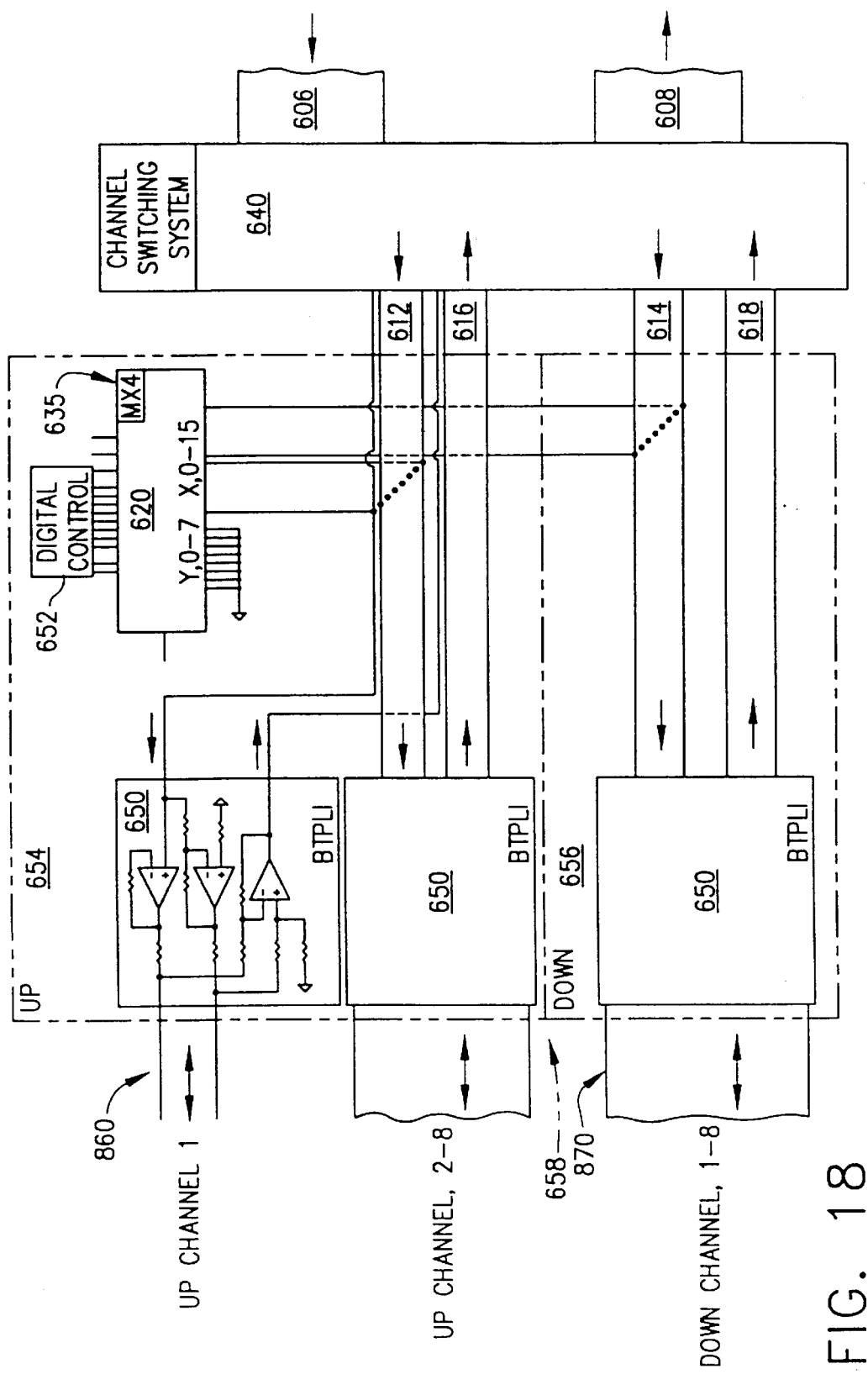
FIG. 18 is a schematic showing the details of the channel twisted pair line interface portion of FIG. 15.

FIG. 18 shows the channel twisted pair line interface 658 of FIG. 15 in greater detail. The channel twisted pair line interface 658 includes a crosspoint switch 635. It receives input from incoming paths 612, 614, from up channels 860, and from down channels 870. It sends signals out along outgoing paths 616, 618, up channels 860, and down channels 870. The digitally-controlled 8×16 crosspoint switch 635 is included in the channel twisted pair line interface 658 for impedance matching only. The crosspoint switch 635 does not involve any switching or routing of signals. Signals arrive from the channel switching system 640 along paths 612 and 614 and travel to their respective bi-directional twisted pair line interface 650. The respective bi-directional twisted pair line interface 650 then converts the signal from common mode to differential mode before it leaves the channel twisted pair line interface 658 along an outgoing up channel path 860 or down channel path 870. Signals being received at the channel twisted pair line interface 658 from the eight up channels 860 and the eight down channels 870 enter their respective bi-directional twisted pair line interface 650 where they are converted from differential mode to common mode and then travel to the channel switching system 640 along their respective reception paths 616 (for up channels) or 618 (for down channels).

Now that the components of the matrix switching system 500 have been described, we can return to FIG. 14 to see how signals travel through the network.

A video signal originates at the video input 800 of a user interface, such as the user interface 530C1 and may be coming from a video codec, video disc player, video camera, cable television, or a video recorder, for example. This analog video signal is in common mode. It travels to a frequency coupler 810 where it is combined with audio and data signals before being transmitted to the hub 750. The frequency coupler is shown in more detail in FIG. 19, to which we will refer later.

Audio signals originate at the audio inputs 900, 902 of a user interface, such as the user interface 530C1. These audio signals, left and right stereo, may be coming in from a video codec, video disc player, video camera with sound, an audio or video tape recorder, or other audio source in common mode. The left and right audio signals pass through frequency modulators 920, 922. The modulated audio signals also travel to the frequency coupler 810, where they are combined with video and data signals before going out over transmission lines 830 to the hub 750.

Digital data signals may be input to a user interface, such as user interface 530C1 at data input 910. User data coming in through data input 910 is first routed through the central processor (CPU) 701 for the user interface 530C1 and then, still in the form of a digital signal, to the first frequency shift key modulator 930. System control data is transmitted from the central processor 701 to the second frequency shift key modulator 940. These first and second frequency shift key modulators 930, 940 put the digital data signals onto analog data signals. The modulated data signals proceed to the frequency coupler 810 of their user interface 530C1, where they are combined with the audio and video signals.

Figure 19:
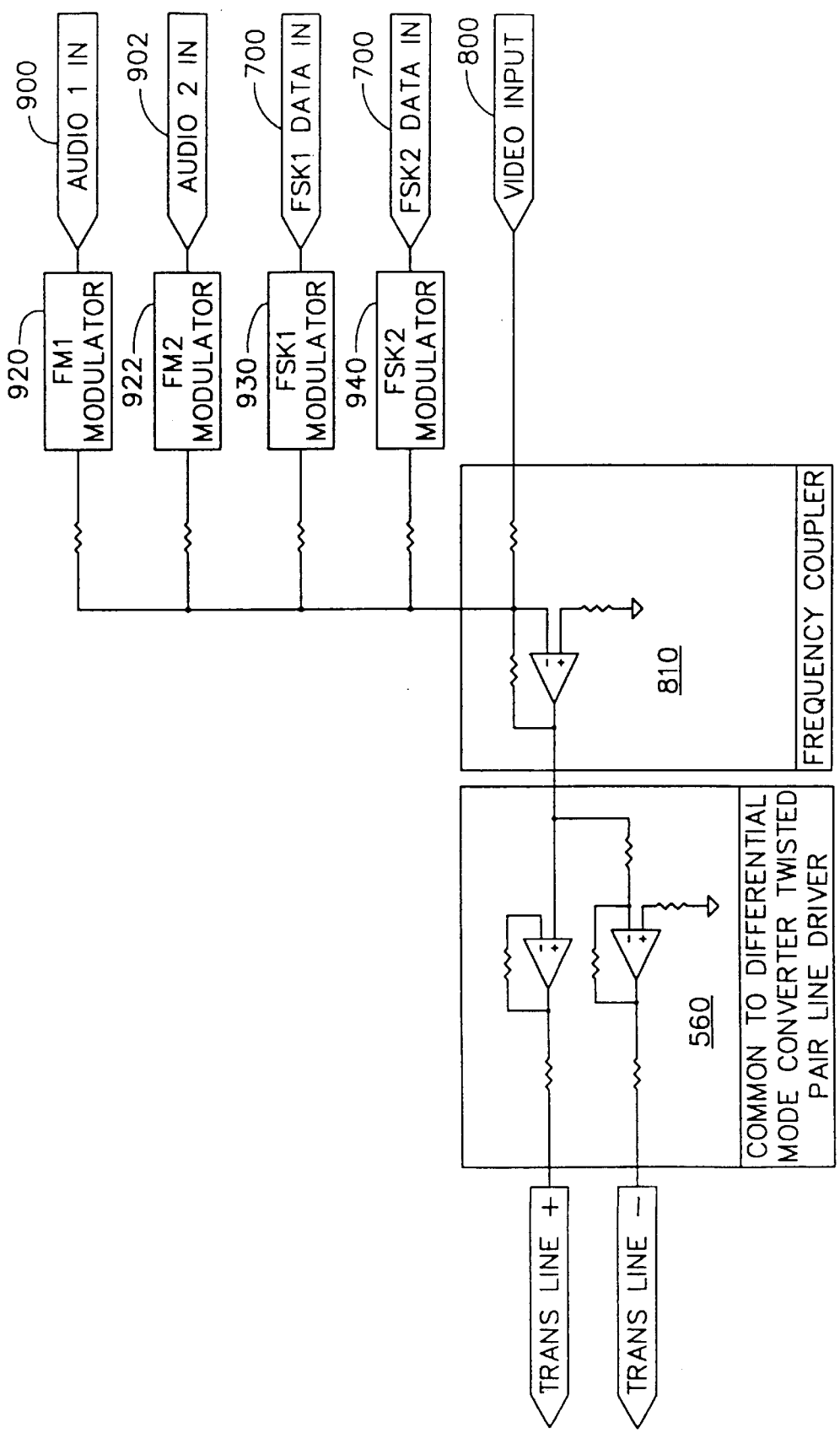
FIG. 19 is a schematic showing the details of the frequency coupler and the common-to-differential-mode converter of FIG. 14.

The combined audio, video and data signal from the frequency coupler 810 of the user interface 530C1 is then routed through the transmission portion 560 of its respective twisted pair termination device 550, which converts the signal from common mode to differential mode. FIG. 19 shows the frequency coupler 810 and common to differential mode converter 560 in more detail. Returning to FIG. 14, the combined signal leaves the transmission portion 560 of the twisted pair termination device 550, travels over the twisted pair 830, and is received at the reception portion 540 of another twisted pair termination device 550 at the hub 750. When the signal is received at the hub, it is converted back into common mode and equalized, which will be described in detail in reference to FIG. 20. It then travels in common mode to a frequency separator 850. The frequency separator 850 separates from the combined audio, video and user data signals the system control data, sends the system control data to the frequency shift key demodulator 857, and sends the remaining combined audio, video and user data signal to the matrix switching system 500 along the path 510. The frequency shift key demodulator 857 converts the system control data from an analog signal to a digital signal and sends it to the central processor 700. The system control data coming in from the various users will tell the central processor 700 how to connect the digitally-controlled switches in the matrix switching system 500. The CPU 700 can send system control data to the other hubs 750 along the digital link 570 to provide other hubs with system control data.

The remaining combined audio, video and user data signal arrives at the matrix 500 along a user transmission path 510, as was described with respect to FIG. 15. The signal is switched through the matrix 500, with the central processor 700 of the hub 750 opening and closing switch points in the crosspoint switches 610, 620, 630 and two-way switches 644, 646 as needed to route the signal in the correct direction. (These switches are found in FIGS. 16 and 17.) If the signal is going to an upstream channel path 860, the signal passes through a bi-directional twisted pair line interface, as discussed in reference to FIG. 18, and the signal leaves the hub 750 via one of the upstream channels 860. Similarly, if the signal is going to a downstream channel path 870, the signal passes through a bi-directional twisted pair line interface, as described in FIG. 18, and the signal leaves the hub 750 via one of the downstream channels 870. If the signal is to go to another user connected to the hub 750, such as user 530C2, shown on the right of the hub 750, then the signal leaves the matrix 500 through the appropriate user reception path 520 and enters another frequency coupler 810 where the combined audio, video and user data signal is combined with a. system control data signal coming from the CPU 700. The combined signal passes through the transmission portion 560 of the twisted pair termination module 550 shown on the right side of the hub 750 of FIG. 14, where it is converted back to differential mode and sent out over a twisted pair 880. The signal is received at the user interface 530C2, goes through the reception portion 540 of another twisted pair termination module 550, where it is converted back to common mode and equalized. The combined signal is then routed through the frequency separator 850 of the user interface 530C2 which separates the signals into audio, video and data signals. The video signal leaves the user interface through the video output 958 to a video codec, video recorder, video monitor, or other device for receiving video signals. The left and right audio signals are directed through first and second frequency demodulators 950, 952, respectively, and then leave the user interface 530C2 through audio outputs 960, 962 to a video codec, an audio or video tape recorder, or other audio receiver. The data signals are directed to the first and second frequency shift key demodulators 855, 857, where they are converted from analog signals to digital signals. The data signals then travel to the CPU 701 of the user interface 530C2 and can leave through data output 964.

Figure 20:
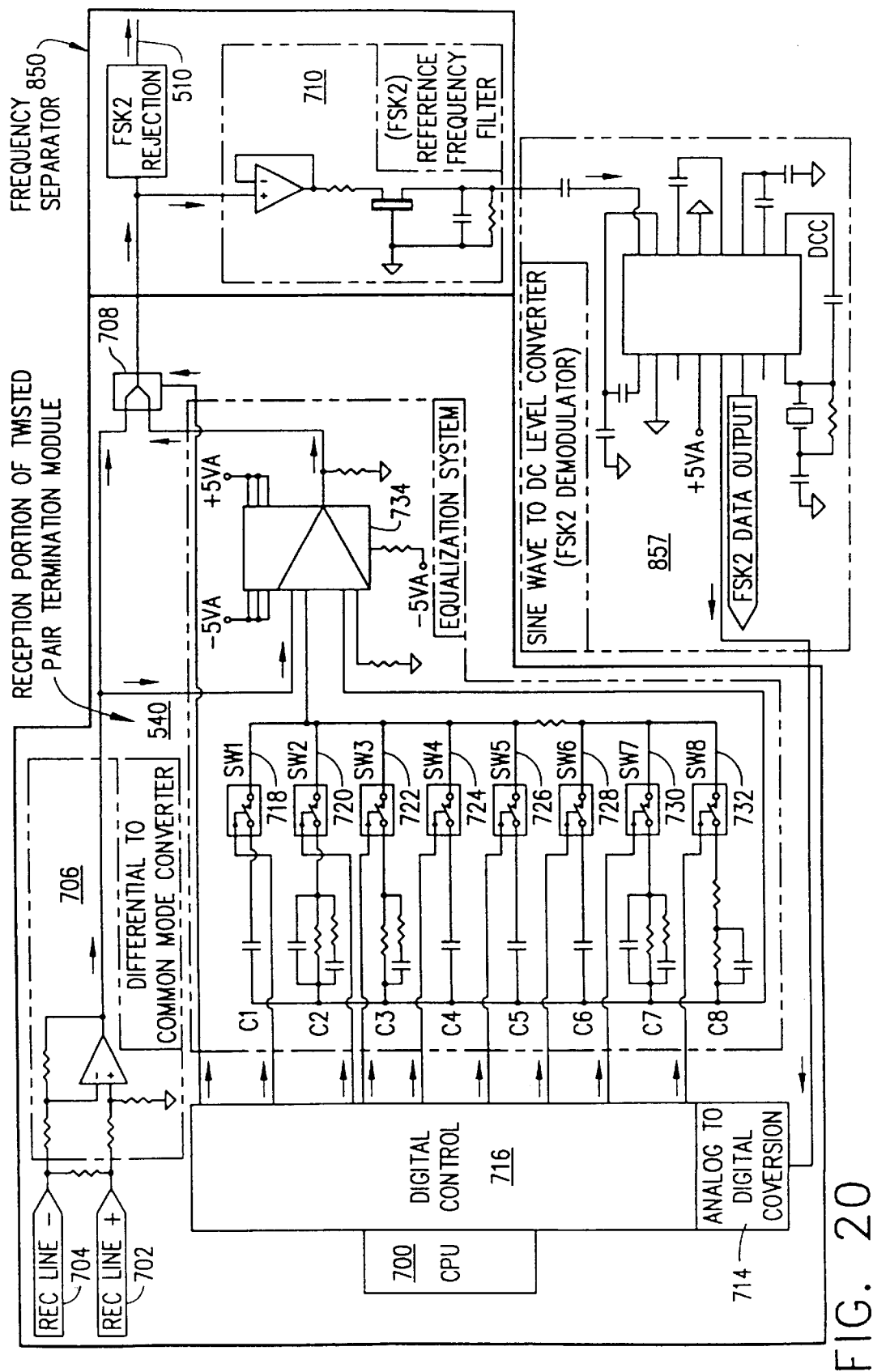
FIG. 20 is a schematic showing the reception portion of the twisted pair termination module, the frequency separator, and the frequency-shift keying demodulator of FIG. 14.

FIG. 19 shows the way signals received at the user interface 530C1 or 530C2 of FIG. 14 are combined and converted to differential mode before being transmitted to the hub 750. FIG. 20 shows the way signals are received at the hub, equalized, and converted to common mode.

In general, FIG. 19 shows that the individual signals, except for the video signal, are modulated. The two carrier frequencies which are used to modulate the user data signal and the system control data signal are designated as reference frequencies and are later used for equalization of received signals, as will be described below.

FIG. 19 shows the circuit that is used for signals which come in to the user interface 530 in common mode and go out in differential mode over twisted pair wiring. A video signal enters in common mode and is buffered at the video input 800. The audio signals entering and being buffered at the audio inputs 900, 902 are translated to new spectral locations by frequency modulation at modulators 920, 922. The user data and system control signals leaving the central processor 700 are translated to new spectral locations by frequency-shift keying modulation at modulators 930, 940. The FM1, FM2, FSK1, and FSK2 modulated signals and the video signal all go to a frequency coupler 810 where the signals are combined. The combined signal then travels through the transmission portion 560 of the twisted pair termination module 550 which converts the common mode signal to differential mode. The combined audio, video, and data signal is then transmitted to the hub 750 along path 830.

FIG. 19 also describes the circuit used for transmission from the hub 750 to the user interface 530. The only difference is that the audio, video, and user data signals are already modulated so the frequency coupler 810 only combines the system control data with the audio, video, and user data signal.

FIG. 20 shows that a signal received at a user interface or at a hub will be converted back to common mode and automatically checked for signal degradation associated with twisted pair transmission. The reference frequency is filtered out and checked for signal degradation. The signal is then automatically equalized based on the amount the reference frequency has been degraded.

FIG. 20 shows the circuit that is used for a signal coming into the reception portion 540 of a twisted pair termination module 550 of FIG. 14 as a differential signal. The combined audio, video, and data signal arrives over twisted pair wiring, arriving on paths 702, 704 at the reception portion 540 of the twisted pair termination module 550. The converter 706 converts the differential mode signal into a common mode signal. The common mode signal then travels to the analog switch 708 which will allow either the existing signal or the equalized signal to pass through. From this analog switch 708, the reference frequency associated with the second Frequency Shift Key Modulator (FSK2) is discriminated through the filter 710 in order to test for signal degradation. The FSK2 signal which has been modulated to the reference frequency is in the form of a sine wave. This sine wave signal is then converted into a DC signal at the frequency shift key demodulator 857. This analog DC signal is then converted into a digital signal at the converter 714. This digital signal is characteristic of the incoming signal degradation that occurred through the transmission line. The amount of signal degradation is then computed by the central processing unit 700 of the hub. (If the equalization were occurring in a user interface, the CPU 701 of the user interface would control the equalization.) Depending on the computation of the amount of degradation, switches 718, 720, 722, 724, 726, 728, 730, and/or 732 can be engaged by the digital control 716 to interact on the equalization amplifier 734 by connecting different equalization circuits. If equalization is required, the analog switch 708 is connected to the amplifier 734 to allow the equalized combined audio, video, and data signal to continue to the frequency separator 850 and the matrix switching system along path 510.

The reference frequency associated with FSK2 is used for auto-equalization only on the initial path from the user interface 530 to the hub 750. The reference frequency associated with FSK1 is used for auto-equalization on the hub-to-user interface path and any subsequent paths taken by the signal. The reason FSK2 is used for the initial path signal degradation is because the FSK2 signal is already being demodulated to obtain the system control data. This arrangement is more efficient because the auto-equalization also uses the demodulation of a reference frequency signal and there would be no reason to demodulate another signal.

While this embodiment has been discussed as having eight channels, it is actually intended to be expanded to 64 channels as was previously discussed with respect to FIG. 8. Unlike the previous embodiment of FIG. 4, this embodiment requires only two pairs of wires to send audio, video, and data simultaneously and bi-directionally between the user and the hub. However, since standard wiring is used, there are actually four pairs of wires between the user and hub, which is not shown in FIG. 14. Therefore, this embodiment frees up two pairs of wire between the user and the hub to perform other functions. The additional two pairs can be used to transmit another set of audio, video, and data signals, or it can be used for high speed transmission of digital data, such as for Ethernet or other high speed digital data networks.

Figure 21:
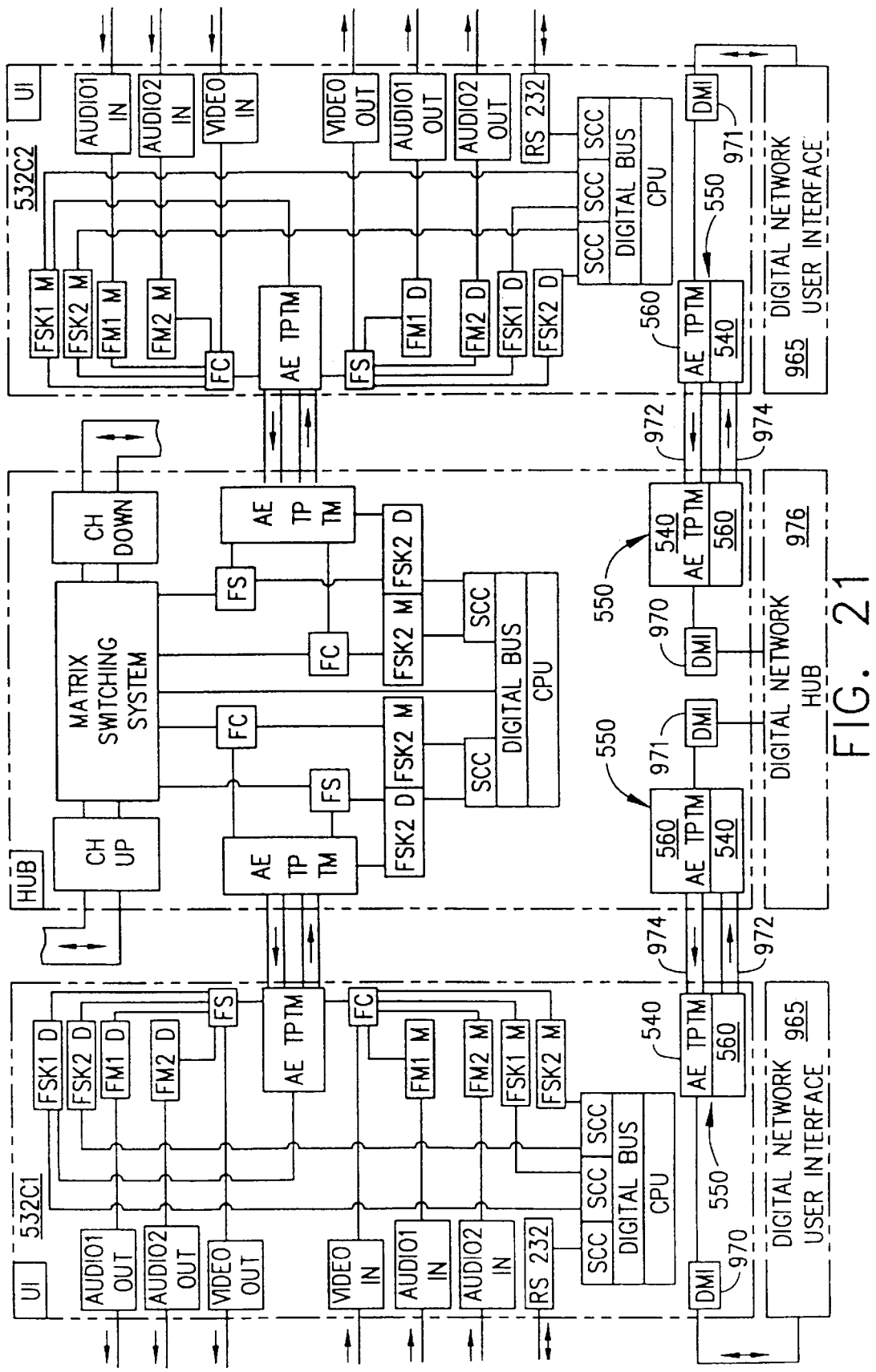
FIG. 21 is a schematic of another embodiment of the present invention showing the flow of audio, video, data and high speed digital data signals from a user interface, through a hub, to another user interface.

FIG. 21 illustrates an embodiment wherein a high speed digital data communication path at each user interface 532C1, 532C2 is made possible using the spare twisted pairs of the cable between the user interfaces and the hub 750. A high speed digital data signal enters the user interface 532C1 through a digital network user interface 965, such as an Ethernet interface. The signal travels through a digital matching interface 970 where the signal is attenuated, preferably down to 300 mV on this embodiment, for the reduction of interference. The attenuated signal then passes through the transmission portion 560 of its respective twisted pair termination module 550 where the signal is converted from common mode to differential mode and a reference frequency is added. A reference frequency must be added for auto-equalization in this case, because no frequency carriers are added on the digital signal. The signal then travels through twisted pair wiring 972 to the hub 750, where it passes through the reception portion 540 of another twisted pair termination module 550. This module converts the signal back to common mode and equalizes the signal. The signal then travels through another digital matching interface 971, where it is amplified back to its original level. The signal then travels through a digital network hub 976, such as an Ethernet or Token Ring hub, where it can be routed to another hub 750 or can travel to another user on the present hub 750 along twisted pair wiring 974. Thus, the present invention permits the use of audio, video, and data transmission along with high speed digital data over the same four pairs of wire, with the high speed digital data remaining in digital form throughout its path.

Figure 22:
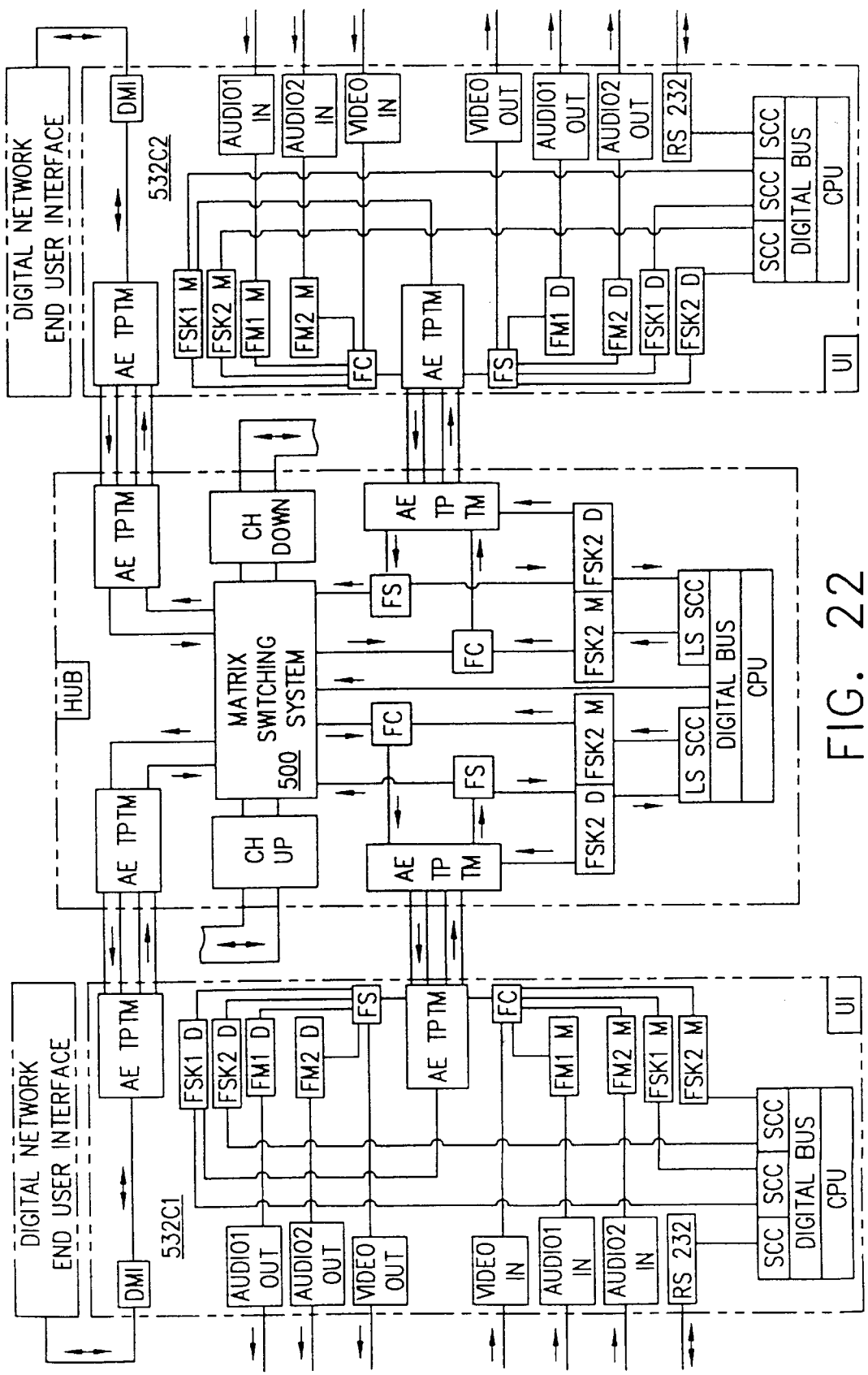
FIG. 22 is a schematic of still another embodiment of the present invention which is similar to the embodiment of FIG. 21 except that the high speed digital data goes through the same matrix switching system as the audio, video, and data.

FIG. 22 illustrates another embodiment of the present invention, wherein the high speed digital data paths share the same switching matrix 500 as the combined audio, video and data signals.

This embodiment is similar to the embodiment described in FIG. 21 except the digital signal does not pass through a digital matching interface 971 in the hub 750, remaining at low voltage through the hub, and it travels through the same matrix switching system as the combined audio, video, and data signals. A digital signal travels through the matrix switching system 500 in the same manner as a combined audio, video, and data signal, which is described in FIGS. 15, 16, 17, and 18. The digital signal goes directly to the matrix 500, without requiring frequency splitting because the system control data has been added to the audio, video and data signal. In this embodiment, eight user paths will be dedicated to high speed data signals and the remaining eight user paths will be used for the combined audio, video, and data signals. A user path could also be dedicated to a local digital network server or a digital public network interface, if desired.

In this embodiment, the user can transmit audio, video, data and high speed digital data signals to another user without making separate connections for each of the signals. Consequently, this combined system will provide greater flexibility and efficiency.

Figure 23:
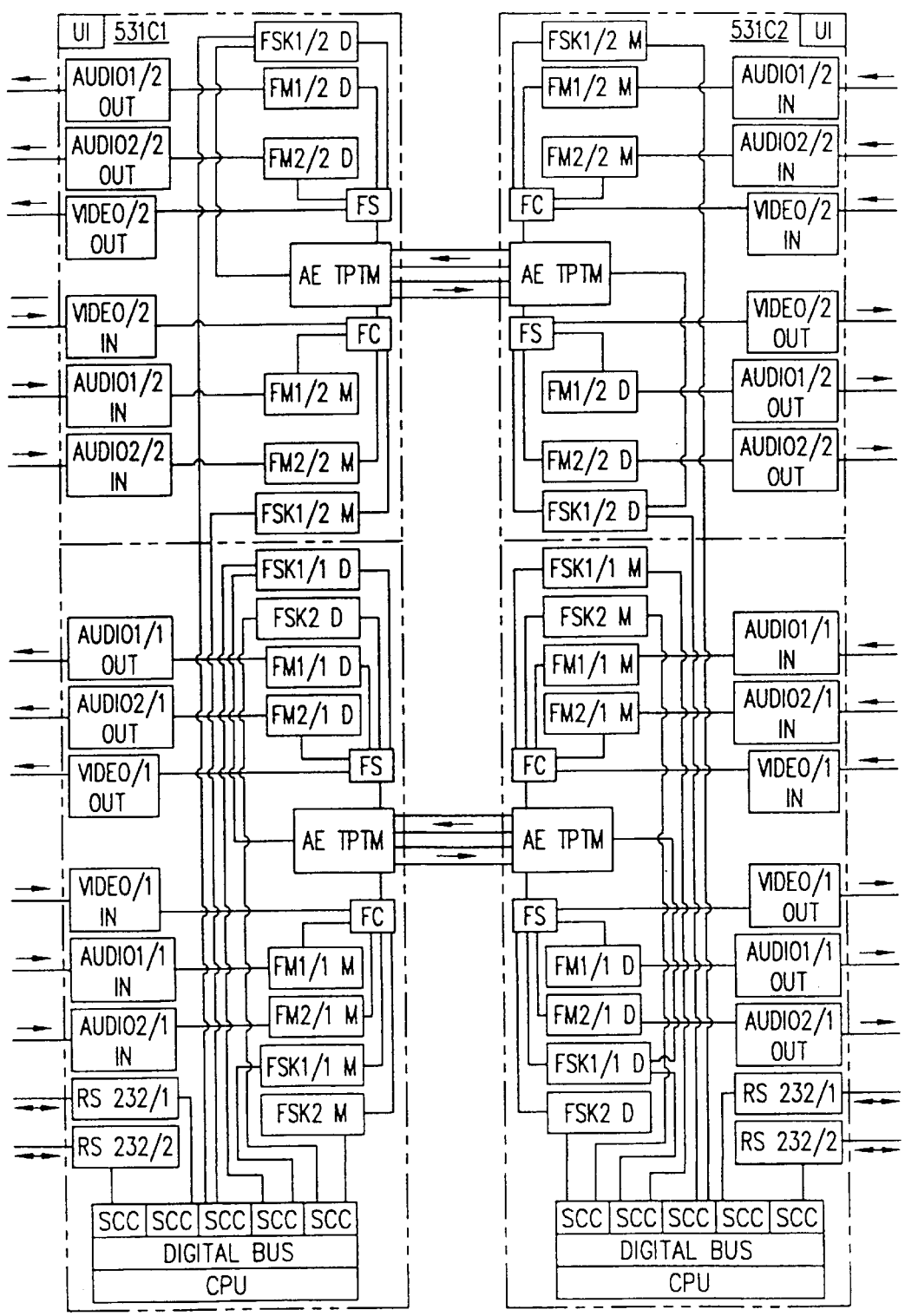
FIG. 23 is a schematic of still another embodiment of the present invention showing the flow of two sets of audio, video, and data signals directly from a user interface to another user interface.

FIG. 23 illustrates another embodiment, wherein two users can communicate directly without passing through the hub. In this embodiment, two user interfaces 531C1, 531C2 are connected together with two sets of bi-directional audio, video, and data paths between them. These user interfaces 531C1, 531C2 are identical to user interfaces 530C1, 530C2 except an additional bi-directional audio, video, and data path is included on the user interface. This could be used, for example, if two users were having a video conference while exchanging full motion video information at the same time.

Figure 24:
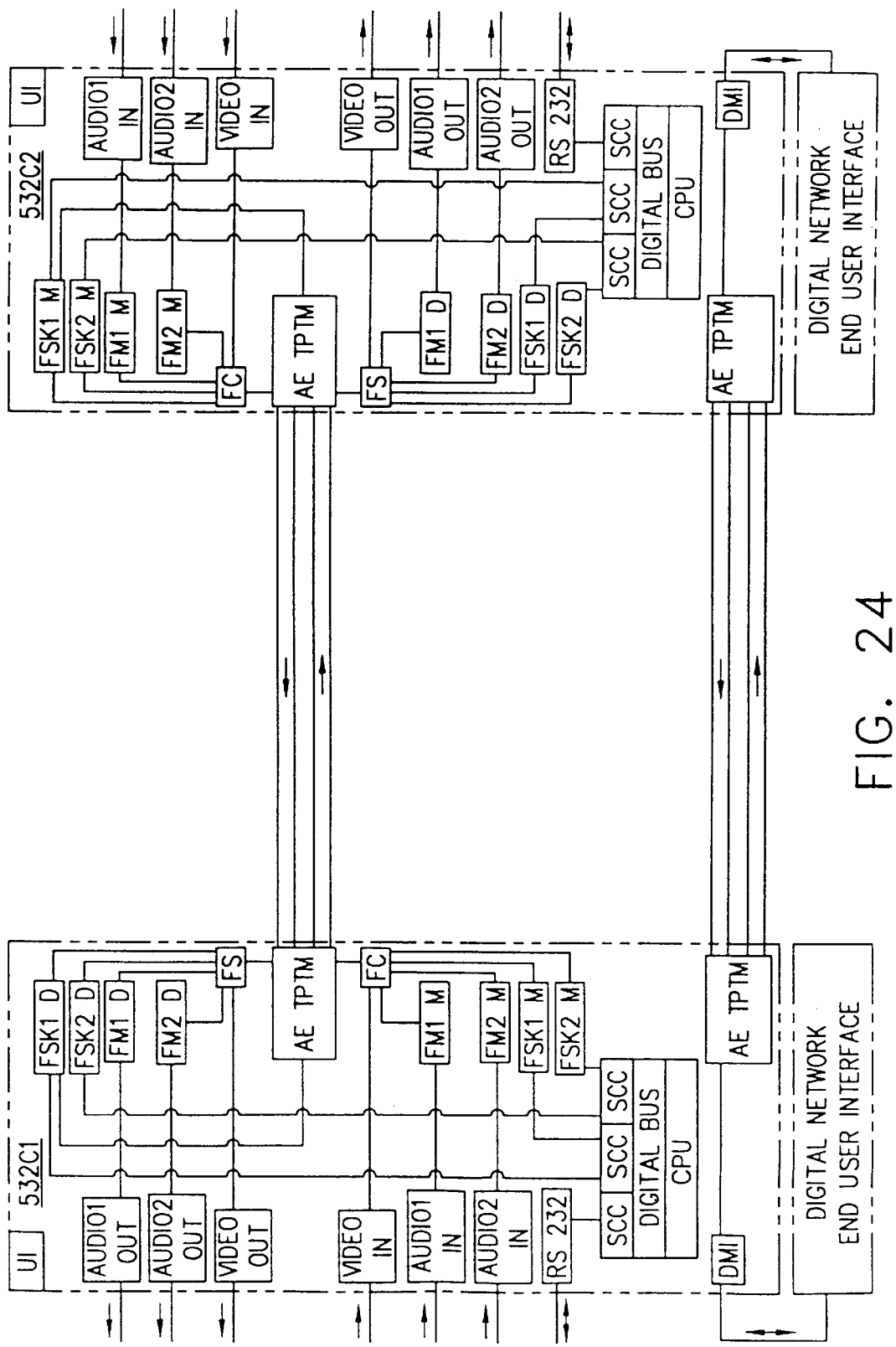
FIG. 24 is a schematic of still another embodiment of the present invention showing the flow of audio, video, data and high speed digital data signals directly from a user interface to another user interface with an external digital interface.

FIG. 24 illustrates another embodiment wherein there is a bi-directional audio, video, and data path between two users 532C1, 532C2, and a high speed digital data communication path between the two users is made possible using the spare twisted pairs of the cable between the user interfaces. This is identical to FIG. 22 but with the hub removed. This could be used for conducting video conferences on the audio, video, and data path while also viewing imaging such as x-rays, cat-scans, etc., on the high speed digital data path.

Figure 25:
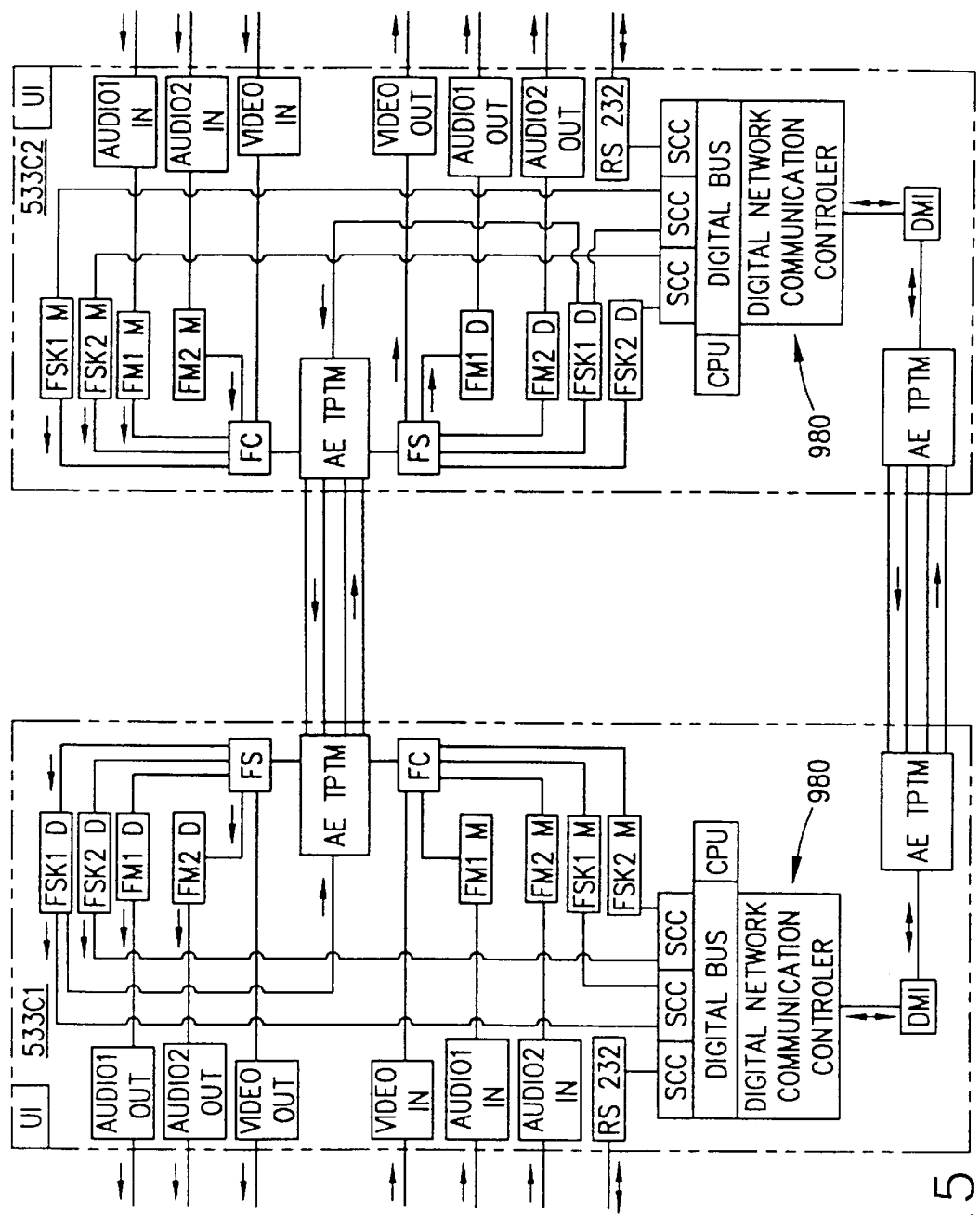
FIG. 25 is a schematic of still another embodiment of the present invention showing the flow of audio, video, data and high speed digital data signals directly from a user interface to another user interface with an internal digital interface.

FIG. 25 illustrates another embodiment, which is the same as FIG. 24, except a digital network communication controller 980 is added to each user interface 533C1, 533C2 so that the high speed digital data communication path does not require an external interface as in FIG. 24.

While preferred modes of signal transmission have been shown throughout the foregoing description, it will be clear that other transmission modes could be used.

It will be clear to those skilled in the art that modifications may be made to the preferred embodiment described above without departing from the scope of the present invention.

What is claimed is:

1. A method for the simultaneous transmission of analog video and digital data signals on a twisted pair cable, comprising the steps of:

combining a first analog video signal and a first digital data signal to create a first combined signal wherein the first combined signal is in common mode;

converting the first combined signal from common mode to differential mode;

transmitting the first combined signal on a first pair of wires in a twisted pair cable;

receiving a second combined signal that includes a second analog video signal and a second digital data signal on a second pair of wires in the twisted pair cable, wherein the second combined signal is in differential mode;

converting the second combined signal from differential mode to common mode separating the second combined signal to obtain the second analog video signal and the second digital data signal.

2. A method for the simultaneous transmission of analog video and digital data signals on twisted pair cable as recited in claim 1, further comprising the step of equalizing the first combined signal upon reception of the first combined signal over twisted pair wiring.

3. A method as recited in claim 1, further comprising the step of sending the first analog video and first digital data signals to a switching matrix within a hub and wherein the second combined signal received on the second pair of wires was transmitted from the hub to the user interface.

4. The method of claim 1, wherein the twisted pair cable includes four twisted pairs of wire, further comprising the steps of:

transmitting a first high-speed digital data signal on the third pair of wires in the twisted pair cable;

receiving a second high-speed digital data signal on the fourth pair of wires in the twisted pair cable.

5. The method of claim 4, wherein the first and second high-speed digital signals data are Ethernet signals.

6. The method of claim 4, wherein the first and second high-speed digital data signals are token ring signals.

7. The method of claim 1, wherein a frequency coupler is used to combine the analog video signal and the digital data signal.

8. A system for the simultaneous transmission of analog video and digital data signals on a twisted pair cable, comprising:

a frequency coupler for combining a first analog video signal and a first digital data signal to create a first combined signal wherein the first combined signal is in common mode;

a twisted pair termination device including:

a transmission portion for converting the first combined signal from common mode to differential mode and transmitting the first combined signal on a first pair of wires in a twisted pair cable;

a reception portion for receiving a second combined signal that includes second analog video signal and a second digital data signal on a second pair of wires in the twisted pair cable wherein the received second combined signal is in differential mode, and converting the second combined signal from differential mode to common mode; and a frequency separator for separating the second combined signal to obtain the second analog video signal and the second digital data signal.

9. The system of claim 8, wherein the twisted pair cable includes four twisted pairs of wire, further comprising:

a high speed digital data twisted pair termination device, including a transmission portion for transmitting a first high-speed digital data signal on the third pair of wires in the twisted pair cable;

a reception portion for receiving a second high-speed digital data signal on the fourth pair of wires in the twisted pair cable.

10. The method of claim 9, wherein the first and second high-speed digital data signals are Ethernet signals.

11. The method of claim 9, wherein the first and second highspeed digital data signals are token ring signals.

12. A system for equalizing a signal sent over twisted pair wiring, comprising:

means for sending a known reference frequency signal on the twisted pair wiring along with the signal to be equalized;

means for receiving the signal at a reception point;

means for splitting the reference frequency signal from the signal to be equalized at the reception point;

means for measuring the amount of attenuation of the reference frequency signal at the reception point;

means for providing a plurality of circuits which can boost the signal varying amounts; and means for automatically selectively engaging said circuits to equalize the signal depending upon the amount of attenuation measured in the reference frequency.

13. A system for automatically equalizing a signal as recited in claim 12, wherein said signal to be equalized has a bandwidth sufficient to carry an analog video signal.

14. A method for automatically equalizing a signal sent over twisted pair wiring, comprising:

sending a known reference frequency signal on the twisted pair wiring along with the signal to be equalized;

receiving the signal at a reception point;

splitting the reference frequency signal off from the signal to be equalized at the reception point;

measuring the amount of attenuation of the reference frequency signal at the reception point;

providing a plurality of circuits which can boost the signal varying amounts; and automatically selectively engaging said circuits to equalize the signal depending upon the amount of attenuation measured in the reference frequency.

15. A method for automatically equalizing a signal as recited in claim 14, wherein said signal to be equalized has a bandwidth sufficient to carry an analog video signal.

16. A method for automatically equalizing a signal sent over twisted pair wiring as recited in claim 15, and further comprising, the step of conducting the method bi-directionally, such that the reception point is also a sending point, and the sending point is also a reception point, and the reference frequency is measured upon reception of signals at both points, and the respective circuits are automatically selectively engaged at both points, depending upon the amount of attenuation of the reference frequency that is measured upon reception at both points.

17. A method for the transmission and switching of analog video and digital data signals, comprising:

providing a crosspoint switch with input points and output points;

sending video signals to at least one of said input points;

simultaneously sending digital data signals to at least another of said input points;

switching said crosspoint switch so that both video and digital data signals are connected to respective output points at the same time;

such that analog video signals and digital data travel through the same crosspoint switch at the same time.

18. A system for the transmission and switching of analog video and digital data signals, comprising:

a crosspoint switch with input points and output points;

means for sending video signals to at least one of said input points;

means for simultaneously sending digital data signals to at least another of said input points;

means for switching said crosspoint switch so that both video and digital data signals are connected to respective output points at the same time;

wherein the analog video signals and digital data travel through the same crosspoint switch at the same time.

* * * * *